United States Patent [19]
Carmichael et al.

[11] 3,904,506
[45] Sept. 9, 1975

[54] APPARATUS FOR CONTINUOUS PRODUCTION OF SPUTTER-COATED GLASS PRODUCTS

[75] Inventors: Donald C. Carmichael; Douglas L. Chambers; Chong T. Wan, all of Columbus, Ohio

[73] Assignee: Shatterproof Glass Corporation, Detroit, Mich.

[22] Filed: Sept. 25, 1973

[21] Appl. No.: 400,561

Related U.S. Application Data

[63] Continuation-in-part of Ser. No. 305,877, Nov. 13, 1972, which is a continuation of Ser. No. 70,143, Sept. 8, 1970, abandoned.

[52] U.S. Cl. ............................. 204/298; 204/192
[51] Int. Cl.² ....................................... C23C 15/00
[58] Field of Search ........................... 204/192, 298

[56] References Cited
UNITED STATES PATENTS

| | | | |
|---|---|---|---|
| 3,294,670 | 12/1966 | Charschan et al. | 204/298 |
| 3,314,873 | 4/1967 | Lunsford | 204/298 |
| 3,340,176 | 9/1967 | Belluso et al. | 204/298 |
| 3,414,503 | 12/1968 | Brichard | 204/298 |
| 3,480,483 | 11/1969 | Wilkinson | 204/192 |
| 3,495,724 | 2/1970 | Beckham et al. | 214/41 |
| 3,525,680 | 8/1970 | Davidse et al. | 204/298 |
| 3,741,886 | 6/1973 | Urbanek | 204/298 |

Primary Examiner—Oscar R. Vertiz
Assistant Examiner—Wayne A. Langel
Attorney, Agent, or Firm—William E. Nobbe

[57] ABSTRACT

A method and apparatus for the continuous production of sputter-coated glass products; such as glass sheets, or other substrates, involving supporting one or more substrates to be coated on a rigid support-platen, passing the platens and substrates horizontally through a series of successive chambers aligned with one another, including an entrance chamber, a coating chamber and a discharge chamber, sealing compartments at the opposite ends of the coating chamber, at the entry end of the entrance chamber and at the exit end of the discharge chamber for sealing said chambers from one another and from the atmosphere, conveyor means in said chambers for carrying the platens and substrates therethrough, and means responsive to movement of the platens through said chambers for automatically and in timed sequence initiating and controlling the complete cycle of operations of the apparatus, including the travel of the platens through the successive chambers, the opening and closing of the sealing compartments and the sputter-coating of one or more continuous films of a selected material or materials on the substrates as they pass through the coating chamber.

14 Claims, 23 Drawing Figures

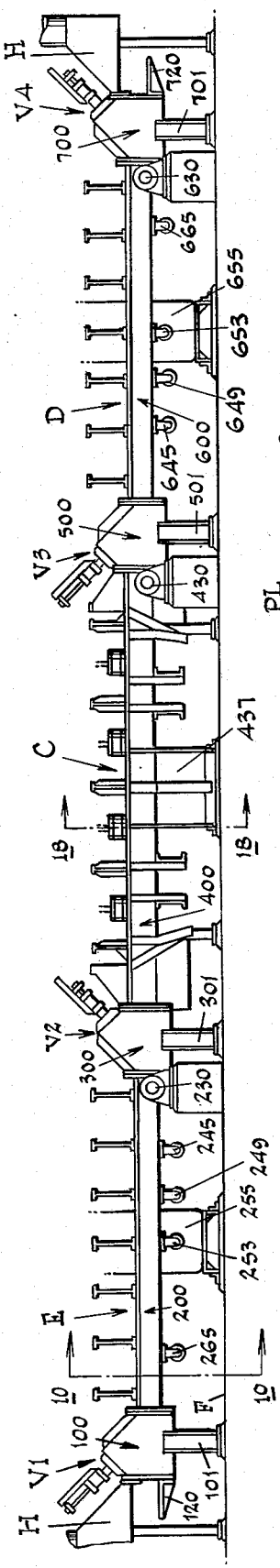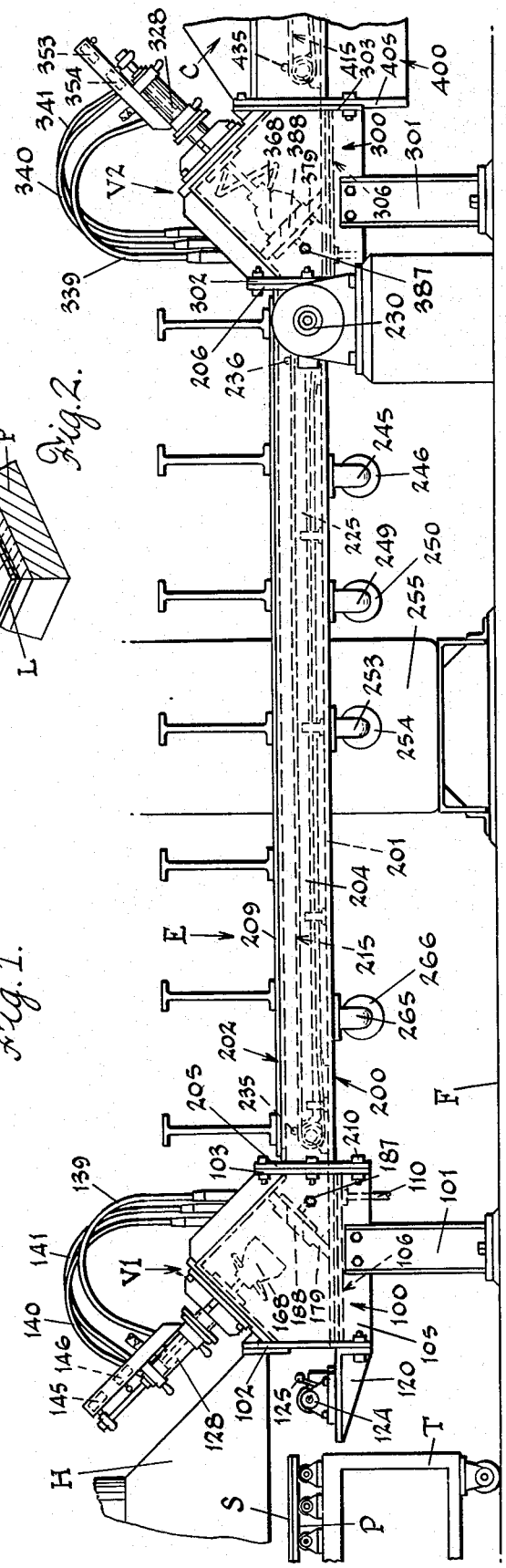

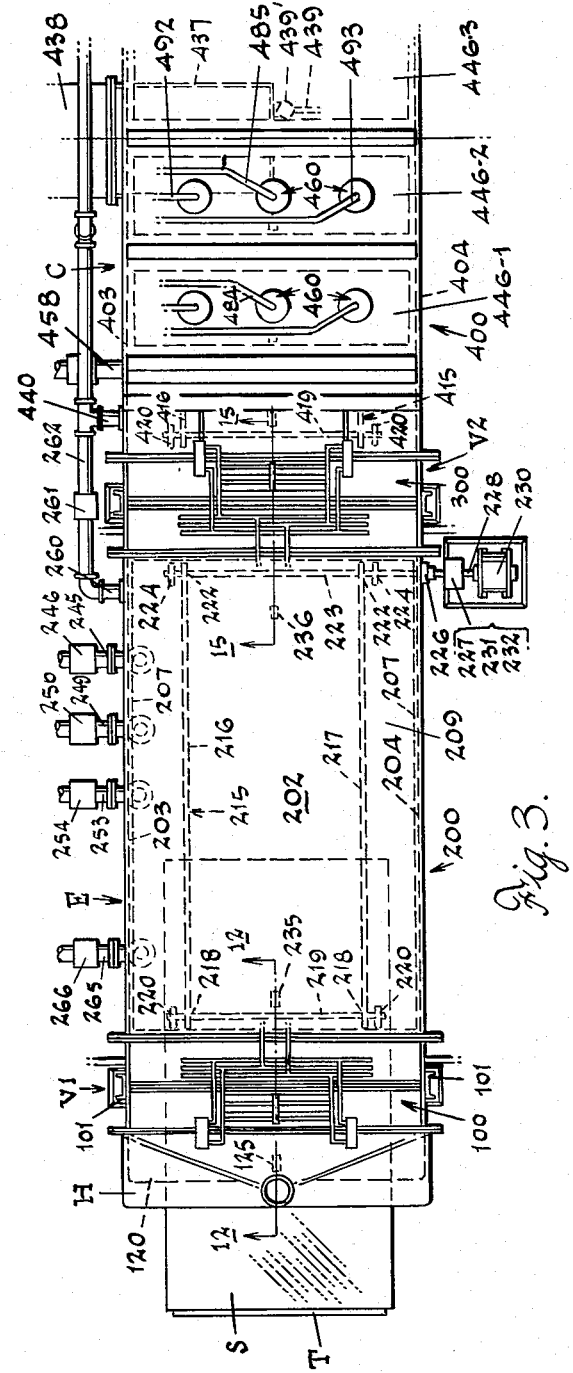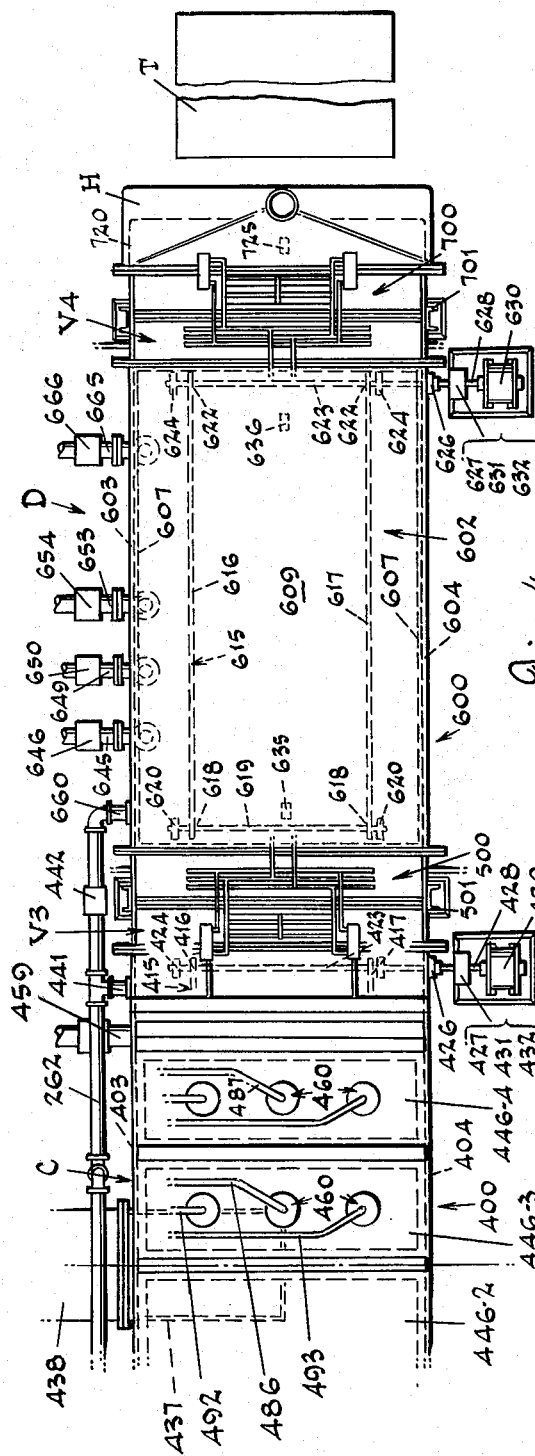

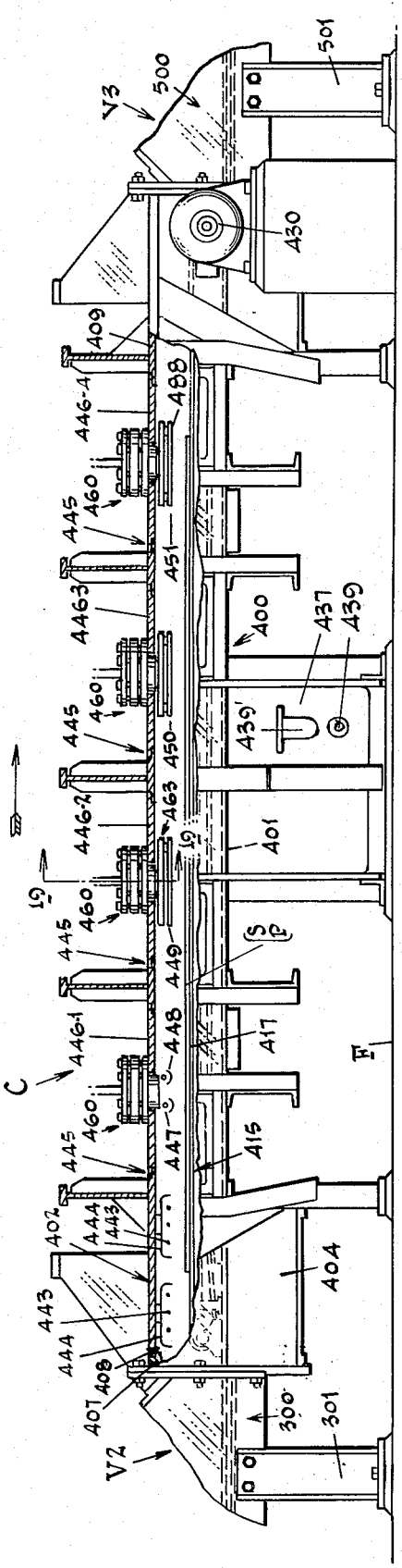

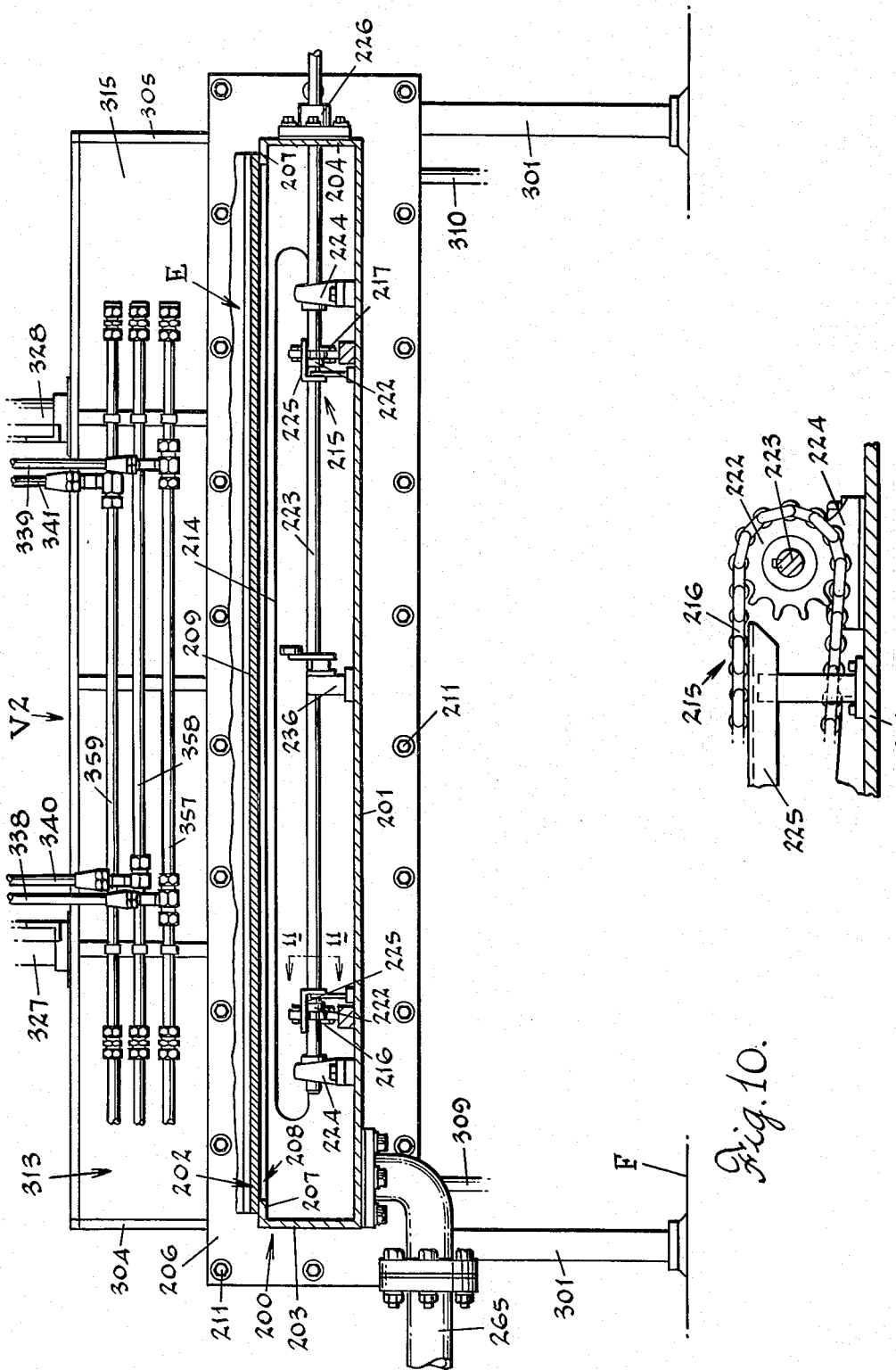

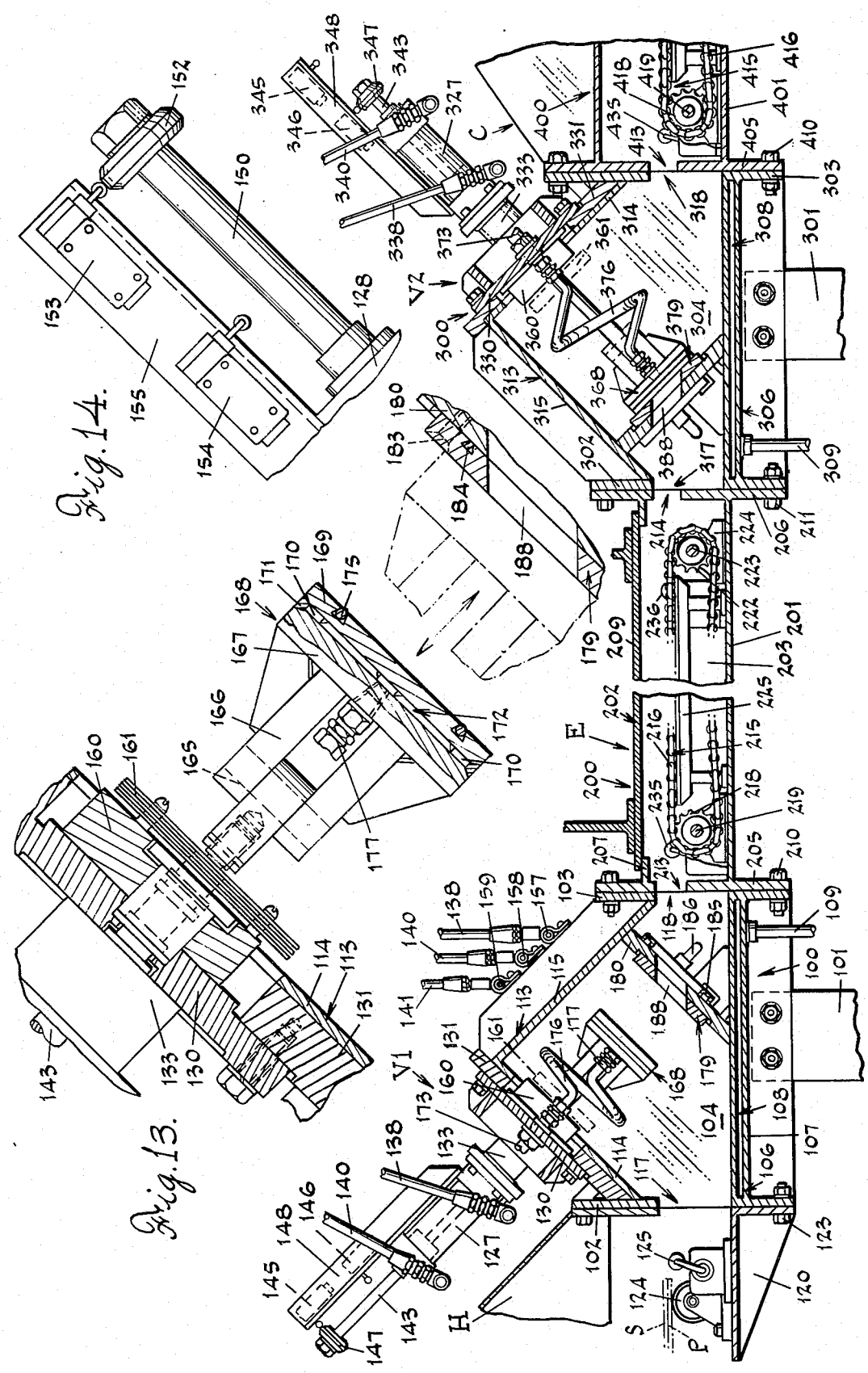

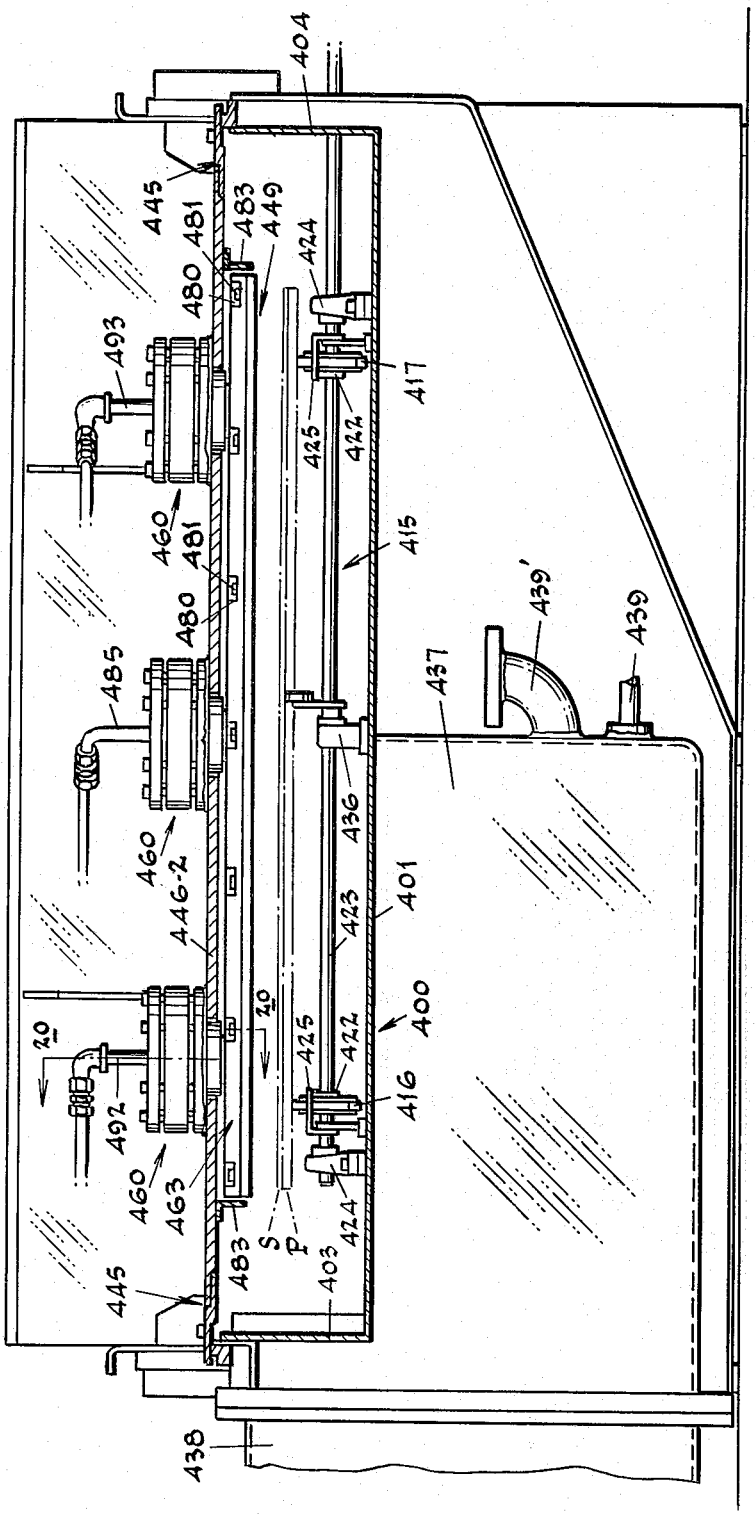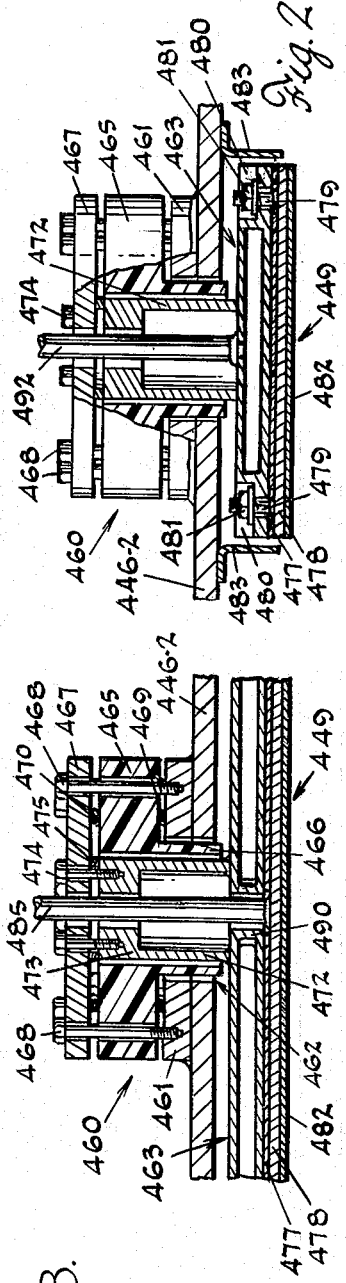

APPARATUS FOR CONTINUOUS PRODUCTION OF SPUTTER-COATED GLASS PRODUCTS

REFERENCE TO RELATED APPLICATIONS

This application is a continuation-in-part application of pending application Ser. No. 305,877, filed Nov. 13, 1972, which is a continuation of application Ser. No. 70,143, filed Sept. 8, 1970 (now abandoned).

BACKGROUND OF THE INVENTION

This invention relates to sputter-coating of glass products (especially window panes) and more particularly to a method and apparatus for sputter-coating such products by a continuous process.

The architectural trend toward using more glass in commercial buildings has been enhanced by the availability of special coated and tinted glasses which not only serve an aesthetic purpose but are also functional. The most significant advantages of the special coated glasses are in the area of air conditioning. Since it generally costs from 3 to 6 times more to cool a building one degree than to heat it by the same amount (depending on the amount of glass used on the exterior of a building), the use of an exterior glass which will reduce the amount of solar radiation entering a building can provide substantial savings since less air conditioning equipment is required and its operation is less costly.

Over the past decade the market for colored and reflective glass in commercial construction has grown significantly. Basically two types of glass are in use — tinted and coated. Tinted glass is made by adding selected metals such as iron, cobalt, and nickel to the molten glass during production. This method is time consuming and wasteful in that when a different color of glass is desired, a 4- or 5-day run of glass must be discarded while the change is made and the new batch stabilized. Also, large quantities of different colors and types of glass must be inventoried. In addition, although tinted glass does reduce glare, it also absorbs solar heat and the absorbed heat is re-radiated from both sides of the glass. Therefore, a greater amount of heat is allowed to enter the building than with coated glass.

Coated or reflective glass is produced by depositing a thin continuous film of a reflective substance such as a metal on at least one of the surfaces of a glass sheet to reflect solar radiation. Coated glass reflects solar radiation much more effectively than tinted glass and coated glass absorbs much less radiation and therefore less heat is re-radiated into the building. The glass sheet is preferably installed with the thin film on the outside of the building to reflect the maximum radiation. However, a durable exterior coating which will not rub or wear off the glass sheet has not yet been perfected. Most companies sell coated glass only in double glazing (two panes separated by an air space) and laminated forms with the thin film protected by an overlying second sheet of glass. The second sheet prevents the film from being worn off or scratched during window washing or by airborn objects or other causes.

There are several processes available for depositing a thin film of reflective coating on a glass substrate. One process that is being used commercially is the vacuum evaporation process. In this process, the coating material source is heated in a vacuum environment to a temperature at which the energy of the atoms of the source material gain sufficient thermal energy to evaporate from the source. The substrate to be coated is placed within the line of sight of the source and the evaporated vapor condenses on its surface. The source is essentially a point source and therefore the coating deposited on a flat substrate will have a thickness distribution dependent on distance from the source. In order to deposit coatings of uniform thickness on large glass windows, the distance between the source and the substrate must be several feet and multiple sources must be used.

Another process for depositing a thin-film coating is called sputtering or sputter-coating. The process of sputter-coating has been known for some time. This process involves ion bombarding a target on the coating material in low-pressure gaseous glow discharge to cause atomic particles of coating material to be dislodged and deposited on the substrate to be coated. We have found that the sputter-coating technique as applied in the present invention produces a product having superior optical properties and improved adhesion. In addition, sputtering also has the advantage over thermal evaporation techniques in that the source (the target or cathode) is not a point or line source but a surface source. This is a particularly important advantage in the present application involving coating of large-area substrates. If a target surface in sputtering is made to be parallel to the substrate surface over all areas of the substrate (like a flat target placed parallel to a flat substrate), the coating thickness will be extremely uniform. Any edge effect in the thickness uniformity can be minimized by making the target dimensions 2 to 4 inches larger than the substrate dimensions. The distance between the target and the substrate surfaces can thus be as close as 2 inches and a relatively small vacuum chamber is required. Sputtering is a somewhat slower process than the thermal vacuum-evaporation process, but for the thin optical coatings of interest this process results in superior control of coating thickness and the rate is satisfactory for commercial production. Because the source (coating) material forming the target will last for a long time, sputtering is adaptable to a semicontinuous or continuous manufacturing operation.

Sputtering has the following advantages over the vacuum evaporation techniques currently in use for production of coated window glass:

A smaller deposition chamber can be used. The vacuum evaporation technique uses one or more point sources which must scan the surface during deposition and with larger substrates the necessary spacing between the sources and the substrate correspondingly increases. The target used in sputtering may be placed much closer to the substrate since point sources are not involved. This reduces the size and expense of the coating equipment.

Sputtering appears to be more reliable and maintenance free as a production system.

Sputtering allows more versatility as the materials may be easily changed from batch to batch. Also a multiple-layer coating of several materials may be deposited during a single run simply by incorporating a sequence of targets in the system. An example of this is the coating of a siliceous material or aluminum oxide protective layer over the reflective film immediately after deposition of the reflective film.

In sputter-coating according to the prior art, the substrate to be coated is placed in an enclosure containing a cathode (target) of the material to be sputtered and an anode which is positively biased with respect to the cathode to establish a gaseous discharge (ion plasma) between the anode and cathode. The enclosure is then sealed and evacuated and later backfilled with a low partial-pressure atmosphere of an ionizable gas such as argon. During operation of the apparatus, the coating material is deposited on the surface of the substrate as a uniform continuous film. After deposition, the apparatus is shut down and the coated substrate is allowed to cool under vacuum. The enclosure is then brought back up to atmospheric pressure, the seal broken, and the coated substrate removed. The next substrate to be coated is then placed in the enclosure which is resealed and again evacuated to the required pressure for operation. This process is time consuming, inefficient, and is not adapted to mass production.

Several semi-continuous, batch-type processes have been developed to increase the capacity of presently used apparatus. The semi-continuous processes generally involve rotating or indexing substrate holders which are loaded on a batch basis. These processes require complicated control systems and still have only limited capacity.

SUMMARY OF THE INVENTION

The present invention provides a process and apparatus for sputter-coating glass products on a continuous production basis. The invention involves placing one or more sheets of glass or other products, to be coated in a horizontally disposed position on the upper surface of a support-platen and continuously passing the platen and sheet or sheets carried thereby horizontally through a series of three successive low pressure regions or chambers. An inert gas is continuously admitted into the central or coating chamber to maintain an inert gas atmosphere in said chamber such that a continuous flow of gas away from the coating chamber is maintained. A continuous film of a selected coating material is sputter-coated on the upper surface of the sheet or sheets as they pass through the coating chamber.

The products to be coated may be heated prior to coating to promote outgassing at the product surface and minimize thermal stresses. Typically the surface of the products are ion bombarded prior to coating to clean the surface. A continuous layer of protective material such as siliceous glass may be radio-frequency sputter-coated over the continuous film as the products pass through the coating chamber.

The apparatus of the present invention includes a first or entrance chamber having entry and exit openings, a second or coating chamber adjacent the entrance chamber and having entry and exit openings, the entry opening of the coating chamber being in communication with the exit opening in the entrance chamber, and a third or discharge chamber adjacent the coating chamber and having entry and exit openings, the entry opening of the discharge chamber being in communication with the exit opening of the coating chamber.

Located between the entry and exit ends of the coating chamber and the adjacent ends of the entrance and discharge chambers are sealing compartments containing valve means operable to place the coating chamber in vacuum-tight relation to the entrance and discharge chambers or for establishing communication therebetween. Sealing compartments are also located at the entry end of the entrance chamber and at the exit end of the discharge chamber and contain valve means for placing said chambers in vacuum-tight relation with respect to the atmosphere or for opening said chambers to the atmosphere.

The apparatus includes means for evacuating the chambers and for providing an inert gas atmosphere in at least the coating chamber. The sputter coating means are mounted in the coating chamber and conveyor means move the platens and sheets carried thereby to be coated through the successive chambers. Heating means and ion bombardment means and radio-frequency sputter-coating means may, and preferably are, provided in the coating chamber.

The advantages of the present invention include continuous operation, simple feed-through means for transfer of the products through the successive chambers, and less vacuum pumping is required, especially diffusion pumping (where required). The present invention also reduces contamination of the coating material as it is deposited onto the glass substrate since the continuous flow of gas away from the central region of the coating chamber prevents atmospheric dust and other contaminants from mixing into the coating during deposition.

A typical product produced using the method and apparatus of the present invention would be a sheet of glass with a smooth continuous surface on which a continuous metallic film is sputter-coated, preferably to a thickness of from 50 to 400 A. The products of primary concern are architectural glass, vehicle windows, and oven windows, although the process and apparatus may be used to sputter-coat other types of products. The substrates are preferably conventional silicate glass including window glass, plate glass, and float glass, although any of the conventional or special purpose glasses may be used. The process may also be used to sputter-coat other types of materials such as ceramics and plastic sheets and strips.

In the production of window glass, the continuous film is preferably sputter-coated to a thickness of from about 50 to about 400A. Films having a thickness less than about 50 A do not provide any significant reduction in solar radiation transmittance and those having a thickness greater than about 400 A will impair the transmission of visible light. A smooth continuous layer of transparent protective material may be deposited overlying the continuous film to protect the film from wear. The protective material is preferably a siliceous material such as silicon dioxide (including quartz), silicon monoxide, or any of the conventional or special purpose glasses such as Pyrex. The protective glass may be clear or it may be tinted to modify the color of the finished article. Any of the forms of aluminum oxide may also be used as the protective material. The protective layer is preferably from about 0.01 to about one micron in thickness. Layers less than 0.1 micron in thickness do not provide any significant protection for the film and those in excess of one micron are uneconomical and may involve problems where materials having coefficients of thermal expansion different from the substrate are employed.

BRIEF DESCRIPTION OF THE DRAWINGS

FIG. 1 is a side elevation of the apparatus for continuously sputter-coating glass sheets or other substrates according to this invention;

FIG. 2 is a fragmentary perspective view of a glass or other substrate provided with a reflective coating layer and a layer of a protective material thereon;

FIG. 3 is a top view of the entrance chamber and the first portion of the coating chamber;

FIG. 4 is a top view of the rear portion of the coating chamber and the discharge chamber;

FIG. 5 is a side elevation of the entrance chamber and the first and second sealing compartments at the opposite ends thereof;

FIG. 6 is a longitudinal section through the coating chamber;

FIG. 7 is a side elevation of the discharge chamber and the third and fourth sealing compartments at opposite ends thereof;

FIG. 10 is a vertical transverse section of the entrance chamber taken on line 10—10 of FIG. 1;

FIG. 11 is a detail view of the drive end of each of the conveyors in the entrance, coating and discharge chambers;

FIG. 12 is a vertical, longitudinal sectional view of the sealing compartment at the entry end of the entrance chamber taken on line 12—12 of FIG. 3;

FIG. 13 is an enlarged detail view of the valve unit provided in each of the sealing compartments;

FIG. 14 is a detail view of the switches and control member employed with each of the valve units;

FIG. 15 is a vertical, longitudinal sectional view of the sealing compartment between the entrance and coating chambers, taken on line 15—15 of FIG. 3;

FIG. 18 is a vertical transverse sectional view of the coating chamber taken on line 18—18 of FIG. 1;

FIG. 19 is a vertical transverse sectional view of the coating chamber taken on line 19—19 of FIG. 6;

FIG. 20 is a vertical view, partly in section, of one of the sputtering cathodes taken on line 20—20 of FIG. 18;

Figure 8:
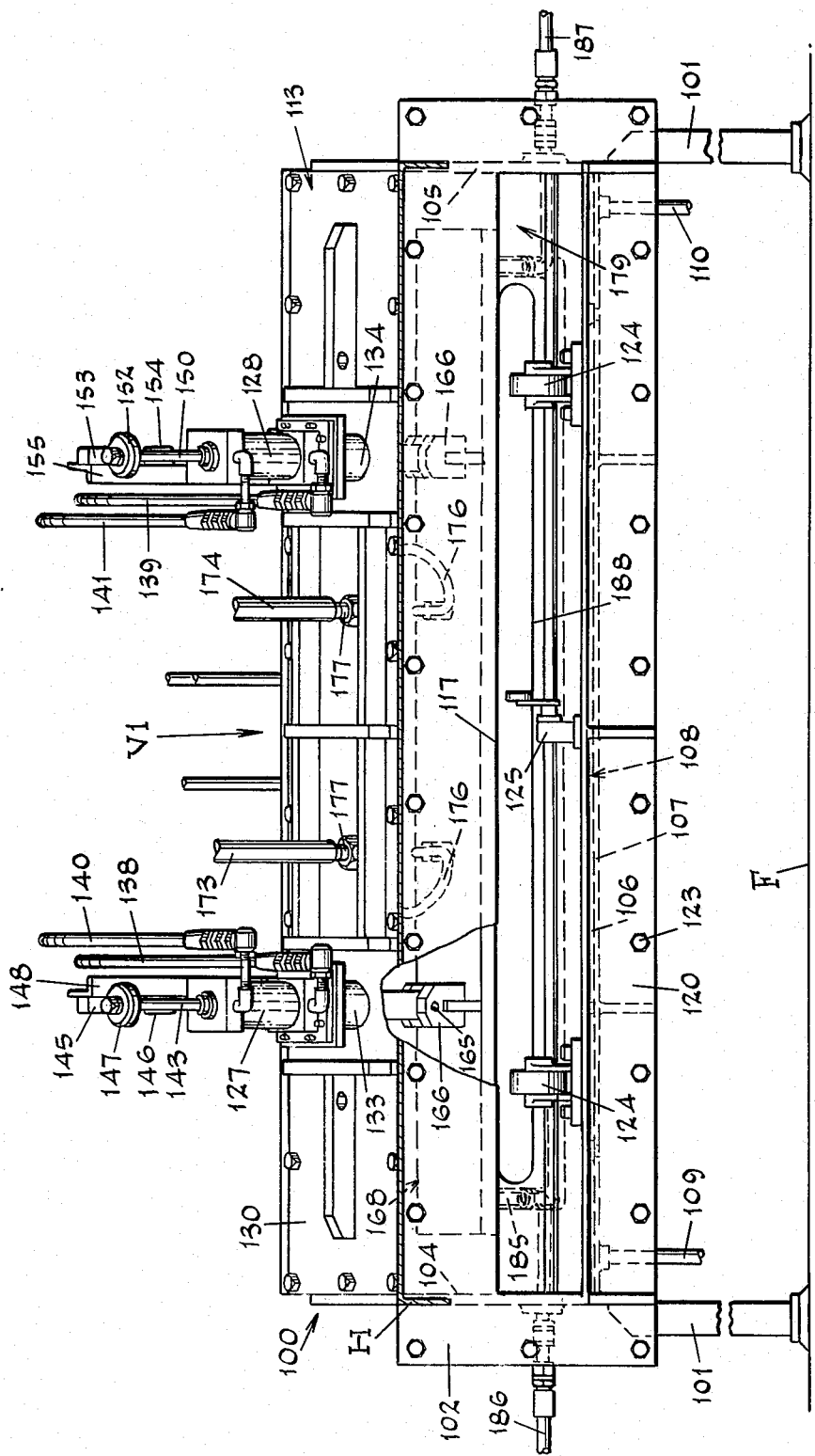
FIG. 8 is a front view of the coating apparatus looking into the first sealing compartment.

The coating apparatus of this invention comprises generally a unitary elongated tunnel-like structure which, as illustrated in FIG. 1, embodies an entrance chamber E, a coating chamber C and an exit or discharge chamber D in alignment with one another. The successive chambers E, C and D are isolated from one another and from the ambient atmosphere and are separated from one another by interposed sealing compartments V1, V2, V3 and V4.

With reference to FIG. 2, the letter P designates a fragmentary section of a support platen which supports the substrate S to be coated, said substrate preferably consisting of a sheet or sheets of glass or other siliceous material. The support platen preferably comprises a rigid metal plate of aluminum of magnesium alloy ¼ to ½ inch thick. One or more layers L of a selected metal, such as nickel or a nickel alloy, is sputter-coated upon the upper surface of the substrate as the platen moves through the successive chambers E, C and D. If desired, a protective layer PL of a siliceous material such as Pyrex glass may be deposited upon the base coating by radio-frequency sputtering.

In accordance with the invention, and by means of suitably actuated controls to be more fully hereinafter described, a platen supported glass sheet or substrate to be coated is carried on a loading cart T (FIG. 5) and delivered to the entry end of the first sealing compartment V1 and moved therethrough onto a conveyor located in the entrance chamber E. When the entire platen is located in the entrance chamber E, the sealing compartment V1 is closed to the atmosphere and, at this time, the sealing compartment V2 is also closed. The entrance chamber E is then pumped down to the desired vacuum then backfilled with an inert gas, preferably argon, to a desired pressure and, by means of communicating conduits between chambers E and C, the vacuum in said chamber E is equalized with that continuously maintained in the coating chamber C.

When this equalization has been attained, the sealing compartment V2 is opened and the substrate carried and guided forwardly therethrough into the coating chamber C where it is received on a conveyor. As the platen continues its forward movement through coating chamber C, there is sputter-coated upon the upper surface of the substrate one or more layers of the desired metal or metals. During coating of the substrate, the desired argon pressure is established in the discharge chamber D and this argon pressure is equalized with that in coating chamber C, at which time sealing compartment V3 is open and sealing compartment V4 remains closed. The platen P is advanced continuously through coating chamber C, and then passes through sealing compartment V3 into the discharge chamber D. After the entire platen P is on chamber D, the sealing compartment V3 is closed. The said chamber D is then vacuum broken to the atmosphere, the sealing compartment V4 opened and the coated substrate S and platen P removed from the apparatus.

However, while the sealing compartment V4 is open, the walls of the discharge chamber D are dried by a warm-air purge unit which is vented to the atmosphere through the sealing compartment V4. Likewise, after the sealing compartment V2 is closed, the entrance chamber E is vacuum broken, after which the compartment V1 is opened to the atmosphere.

FIRST SEALING COMPARTMENT

The sealing compartment V1 (FIGS. 5, 8, 9 and 12) is formed by a body structure or housing 100 supported on the floor F by pedestals 101 made up of a front vertically disposed transverse wall 102, an oppositely disposed vertical rear wall 103, and side walls 104 and 105. The housing 100 further includes a horizontal bottom wall 106 integrally joined to the walls 102–105. The bottom wall 106 has a lower panel 107 spaced therebeneath to provide a hollow chamber 108 through which a coolant is adapted to be circulated from an inlet pipe 109 to an outlet pipe 110. The top wall 113 of housing 100 is formed by panels 114 and 115 angularly disposed with respect to one another. Thus, the panel 114 angles upwardly from the front wall 102 while the panel 115 slopes downwardly and is joined at its lower edge to the rear wall 103.

The front wall 102 is provided with a horizontal, elongated opening 117 through which the platen P and substrates S to be coated pass in entering the sealing compartment V1, while the rear wall 103 has a similar aligned opening 118 for passage of the platen from compartment V1 into the entrance chamber E.

Extending forwardly from the front wall 102 is a horizontal platform 120 secured to said wall by bolts 123. The platform 120 supports at least two roller devices 124 for supporting the platen P as it is being moved from the cart T into the sealing compartment V1 through opening 117 in said front wall (FIG. 5). A limit switch 125, mounted on the platform 120, is actuated by the leading end of the platen and controls an electric circuit which prevents accidental closure of the compartment V1 until the trailing end of the platen P has been received within the entrance chamber E (FIG. 5).

A hood H is secured to the front wall 102 above the platform 120, said hood being connected to an exhaust system to draw off the heated air that is introduced into the entrance chamber E by a warm air purge unit for the purpose of warming and drying the interior of said chamber to prevent moisture from condensing on the chamber walls.

Figure 9:
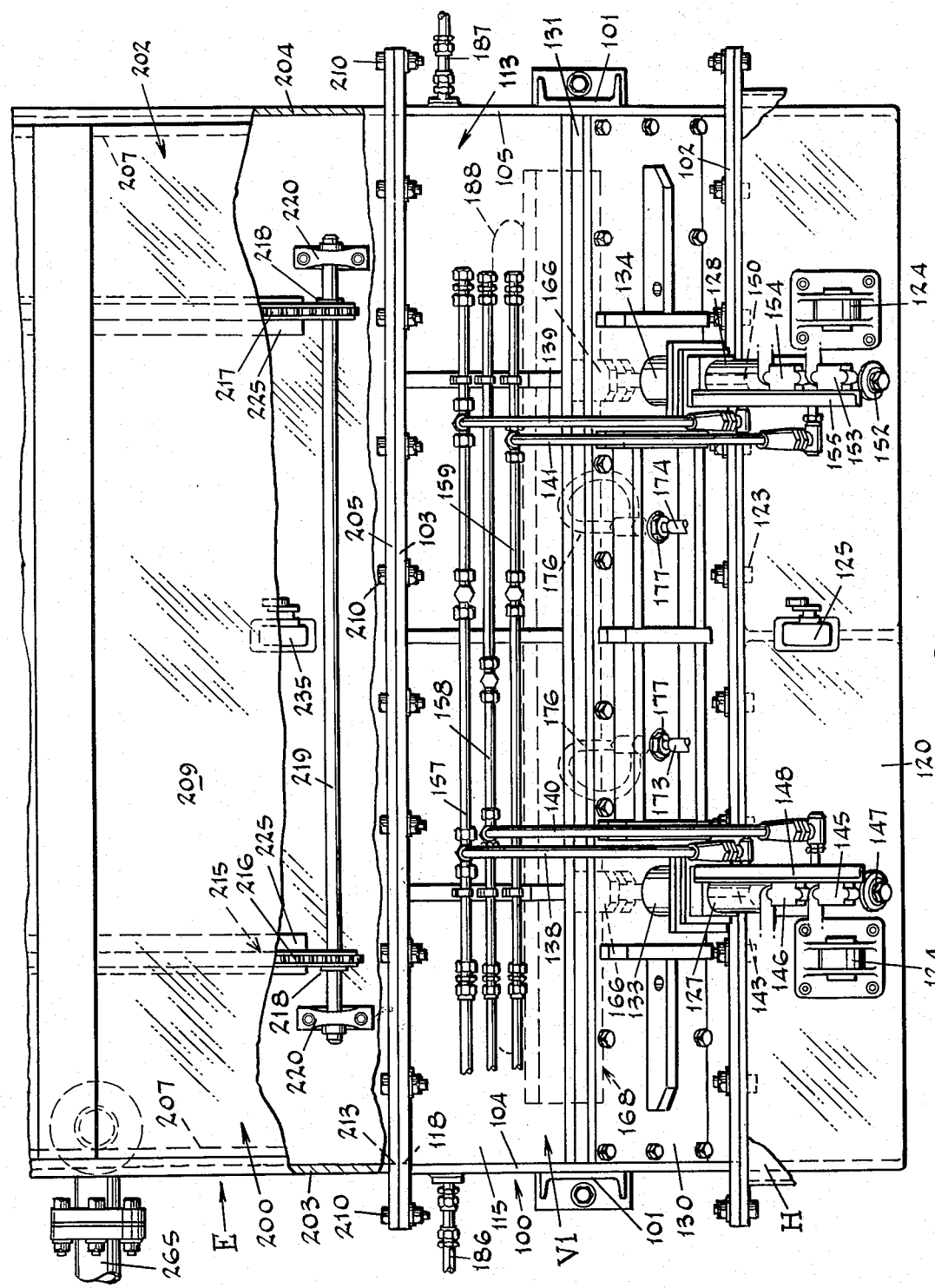
FIG. 9 is a plan view of the first sealing compartment and a portion of the entrance chamber.

The top panel 114 of housing 100 mounts a pair of transverse aligned hydraulic cylinders 127 and 128 that are substantially identical with one another (FIGS. 8 and 9). These cylinders are mounted on a base plate 130 secured to a frame 131 (FIG. 12) affixed to the angularly disposed panel 114. Carried by the base plate 130 are tubular pedestals 133 and 134 for supporting the cylinders 127 and 128.

The lower end of the cylinder 127 is supplied with pressure and for exhaust through a pipe 138 while the cylinder 128 is equipped with a like pipe 139. The upper end of cylinder 127 is connected to pressure and/or exhaust sources by a pipe 140, with the upper end of cylinder 128 having connected thereto a pipe 141 for the same purpose. A piston rod 143, having a piston 144 within the cylinder 127, projects outwardly therefrom to actuate a limit switch 145 located at the upper end of its movement and a limit switch 146 at the lower end of its movement by means of a control member 147 carried by said piston rod. The switches 145 and 146 are mounted on a bracket 148 affixed to the body of cylinder 127.

As best seen in FIGS. 8 and 9, the piston rod 150 having a piston contained in cylinder 128 is equipped at its outer end with a control member 152 to similarly actuate (FIG. 14) a limit switch 153 at the upper end of its movement and a limit switch 154 at the lower end of its movement, said switches 153 and 154 being mounted by a bracket 155 on the cylinder 128. As will also be seen in FIG. 9, the pipes 138 and 139 are supplied with hydraulic pressure through suitable valves from a common distributor pipe 157. The pipe 140, however, is independently supplied through a distributor pipe 158, while the pipe 141 is supplied through a distributor pipe 159.

In this connection, the piston rods 143 and 150 enter the sealing compartment V1 through the pedestals 133 and 134 respectively and similar glands 160; heat dissipating units 161 being provided at the inner ends of said glands. The piston rods 143 and 150 of the respective cylinders are connected at their inner ends by means of pins 165 to blocks 166 secured to the upper surface of a plate 167 which forms the top component of a valve member generally designated by the numeral 168, a plate 169 forming the lower component and spaced from the plate 167 by bars 170.

The plates 167 and 169 are secured together by a continuous weld 171 thereby forming a hermetically sealed chamber 172 within the valve member 168. The chamber 172 is supplied with a circulating coolant through pipes 173 and 174 to maintain the valve member 168 within a suitable temperature range and to prevent deterioration of an "O" ring 175 located in a groove in the bottom surface of the plate 169. To facilitate connection of the valve member 168 to the pipes 173 and 174 and enable freedom of reciprocal movements of said valve member, flexible hoses 176 are employed between the fittings 177 in the plate 130 and the plate 167.

The sealing compartment V1 is closed when it is desired to preclude entry of outside air into the entrance chamber E by the application of hydraulic pressure to the upper ends of the cylinders 127 and 128 to actuate the pistons 144 and 151 to move the valve members 168 into surface-to-surface contact with a fixed angular valve seat 179 secured to a base plate 180 that is sealed about its perimeter to the side walls 104 and 105, the bottom wall 106 and the panel 115 of top wall 113. The valve plate 180 is provided with a recess in which the valve seat 179 is secured by screws 183; the valve seat 179 having a groove in its lower face to receive an O ring 184 which is forced by the screws 183 against the plate 180. The plate 180 is kept at the desired temperature by means of a U-shaped tubular element 185 fixed to the under surface of said plate and connected to a source of supply through pipes 186 and 187. A horizontally elongated opening 188 is formed in the panel 179 and is longitudinally aligned with the openings or passages 117 and 118 at the opposite ends of the sealing compartment V1. As viewed in FIG. 8, the pipes 186 and 187 project outwardly through the side walls 104 and 105 of said sealing compartment.

THE ENTRANCE CHAMBER

Figure 16:
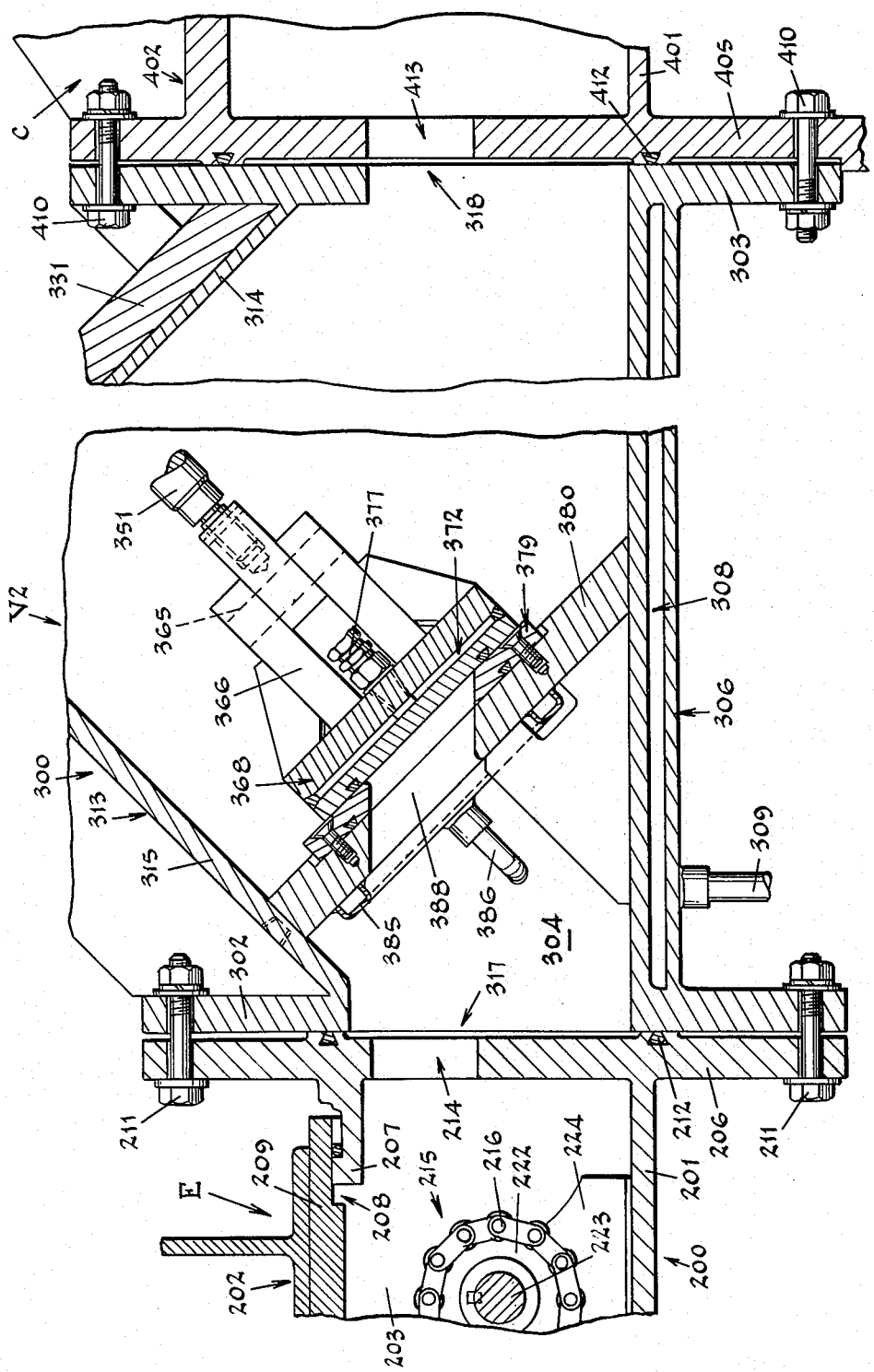
FIG. 16 is an enlarged sectional view of the sealing compartment between the entrance and coating chambers and portions of said chambers.

The entrance chamber E (FIGS. 3, 5, 12, 15 and 16) embodies a horizontal, elongated housing designated in its entirety by the numeral 200 and comprising a bottom wall 201, a top wall 202, side walls 203 and 204 and vertically disposed front and rear walls 205 and 206 respectively. The top wall 202 consists of a horizontal perimeter flange 207 which provides an open area 208 that is hermetically sealed by a top plate 209. The front wall 205 is sealingly secured to a rear wall 103 of the sealing compartment V1 by bolts or the like 210. In FIG. 16, wherein the structural details are shown in enlarged scale, the rear wall 206 is secured to the front wall 302 of the sealing compartment V2 by bolts 211. The desired seal is effected by an O ring 212 located in a peripheral groove formed in the opposed surfaces of either or both the front and rear walls 206 and 302. The front wall 205 of entrance chamber E is provided with an opening 213 registering with the opening 118 in the rear wall 103 of sealing compartment V1, while the rear wall 206 thereof has an opening 214 aligned with the opening 317 in the front wall 302 of the sealing compartment V2.

A conveyor system 215 is provided in the entrance chamber E for carrying the platens P and substrates S supported thereon from the roller devices 124 on receiving platform 120 through the sealing compartment V1 and said entrance chamber E. This conveyor includes a pair of transversely spaced, endless roller-type chains 215 and 217 (FIGS. 3, 9, 11 and 12). These chains are trained about idler sprockets 218 keyed to a shaft 219 journaled in bearings 220 at the entry end of entrance chamber E and at the exit end thereof around sprockets 222 keyed to a driven shaft 223 journaled in bearings 224 (FIG. 11). Between the pairs of sprockets 218 and 222, the upper flights of the chains 216 and 217 traverse similar tracks 225 to adequately support the platens and substrates.

The shaft 223 is projected outwardly through the side wall 204 of entrance chamber E through a suitable sealing gland 226 and connected to an electrically energized clutch 227 (FIG. 3) to operatively connect shaft 223 to the drive shaft 228 of a motor 230 provided with a brake 231 (FIG. 3). The motor 230 is variably controlled to vary the speed of the conveyor, as will be hereinafter described, by means of a resistance unit 232. Driving power to the motor 230 can be discontinued by the clutch 227 and the brake 231 automatically applied as the platen approaches the sealing compartment V2 in the event that the same is closed. As will be more fully hereinafter noted, the operation of the motor 230 is initiated and/or halted by the use of suitable switches responsive to the movement of the platen P.

In the operation of the apparatus, the conveyor 215 is halted when the platen and substrate to be coated has been carried to a point adjacent the exit end of the entrance chamber E. The sealing compartment V1 is then closed, (with the sealing compartment V2 being also closed at this time) and the chamber E pumped down to the desired vacuum. The entrance chamber E is then backfilled with an inert gas (preferably argon) until the pressure in said chamber is equalized with the pressure continually maintained in the coating chamber C. When this has been achieved, with the sealing compartment V3 being closed, the sealing compartment V2 is opened and the conveyor 215 started to move the platen and substrate onto the conveyor 415 within the coating chamber C; both conveyors 215 and 415 being operated at the same speed. In order to effectively control the sequence of operations of the apparatus, the entrance chamber E is provided adjacent its entry end with a limit switch 235 which is connected into the circuit of the switch 125 on the receiving platform 120. This arrangement prevents inadvertent closure of the sealing compartment V1 until the trailing end of the platen has been received in the entrance chamber E.

A limit switch 236 located adjacent the exit end of entrance chamber E is actuated by the leading end of the platen to initiate several important functions. Firstly, the switch 236 (FIG. 22) causes actuation of the resistance unit 232 to decrease the speed of the conveyor 215 from a relatively high speed of around 60 FPM to a stop by deenergizing the clutch 227 and energizing the brake 231. After the sealing compartment V2 has been opened, the resistance unit starts the conveyor 215 to move the platen onto the conveyor 415 in the coating chamber at its high speed.

Secondly, switch 236 controls the introduction of hydraulic pressure to the upper ends of the cylinders 127 and 128 (FIGS. 8 and 9) to close the sealing compartment V1; the pressure being terminated upon the closing of the switches 146 and 154 by the control members 147 and 152 carried by the piston rods 143 and 150 respectively. This closing of the switches 146 and 154 also starts the pump down of the entrance chamber E, and activates a timer which will, at the end of the pump down period, stop the pumping and start the backfill cycle with an inert gas until a vacuum gauge (not shown) is satisfied. An equalizing conduit system is then opened between chambers E and C to bring the vacuous conditions into equilibrium with one another. After this has been accomplished, the sealing compartment V2 can be opened.

As illustrated in FIGS. 13 and 5, the entrance chamber E is connected to a central vacuum pumping system by conduit 245 through a valve 246 and also to a backfill unit (not shown) by conduit 249 through a valve 250 and further to a "vacuum break" unit by conduit 253 and valve 254 to a baffling chamber 255 (FIG. 5) which is employed to reduce any air turbulence as the vacuum in the chamber E is relieved preparatory to opening of the sealing compartment V1. This, of course, occurs after the platen has been moved into the coating chamber C and the sealing compartment V2 is closed.

Thus, while the sealing compartment V1 is closed, the valve 246 is opened to connect the entrance chamber E to a vacuum pump through the conduit 245. Through a timing device, when the valve 246 is closed, the valve 250 is opened to the backfill unit to admit an inert gas, such as argon, into the entrance chamber E until a vacuum gauge indicates that the required pressure therein has been reached. The backfill unit operates to raise the pressure in the chamber E to equalize the pressure therin with that in coating chamber C. Communication between the chambers E and C to achieve equilibrium is made through a conduit 260 while the equalization valve 261 is open to a main conduit system 262, as will be more fully hereinafter explained.

The entrance chamber E is also connected, by conduit 265 through a valve 266, to a warm air blower system to dry the interior of chamber E. This system includes generally a blower unit, a heater and an air purge unit. Between the heater and air purge unit, the system is connected by means of a by-pass valve that is adapted to "shunt" the warm air into the atmosphere while the chamber E is closed and under vacuum.

SECOND SEALING COMPARTMENT

With reference particularly to FIGS. 3, 5, 10, 15, 16 and 17, the sealing compartment V2 is formed by a housing 300, supported by pedestals 301 on the floor F. The housing has a front vertically disposed wall 302, a vertical rear wall 303 and side walls 304 and 305. The bottom 306 of the housing is provided with a chamber 308 through which a coolant is passed from the inlet pipe 309 to the outlet pipe 310 (FIG. 10) in the same manner as described with reference to sealing compartment V1. Similarly, the top wall 313 consists of the angularly disposed panels 314 and 315. The front wall 302 is provided with an elongated horizontal opening 318 registering with the opening 214 of the entrance chamber E and through which the platen and substrate pass upon entering the sealing compartment V2. The rear wall 303 of sealing compartment V2 has an elongated horizontal opening 317 which is aligned with a similar opening in the front wall of the coating chamber C and through which the platen and substrate pass into the coating chamber.

Carried by the top panel 314 of housing 300 is a pair of transversely aligned sealing mechanisms 327 and 328 (FIG. 17) similar to sealing mechanisms 127 and 128. The sealing mechanisms 327 and 328 are mounted on a base plate 330 secured to a frame 331 on the top panel 314 by means of tubular pedestals 333 and 334 supporting hydraulically operated cylinders 327 and 328. The lower end of the cylinder 327 is supplied with pressure through a pipe 338 while the lower end of the cylinder 328 is supplied by a pipe 339 for the same purpose. The upper end of cylinder 327 is likewise connected to a pressure source through the pipe 340, with the upper end of cylinder 328 being connected to a pressure source by pipe 341.

The piston rod 343 of a piston in cylinder 327 projects outwardly to actuate a limit switch 345 at the upper limit of its movement and a limit switch 346 at the lower limit of its movement through a control member 347 carried by said piston rod. The switches 346 and 347 are mounted on a bracket 348 secured to the cylinder 327. The piston rod 350 of a piston in cylinder 328 likewise carries a control member 352 to similarly actuate a limit switch 353 at the upper limit of its movement and a limit switch 354 at the lower limit of its movement, said switches being mounted by a bracket 355 on the cylinder 328.

Figure 17:
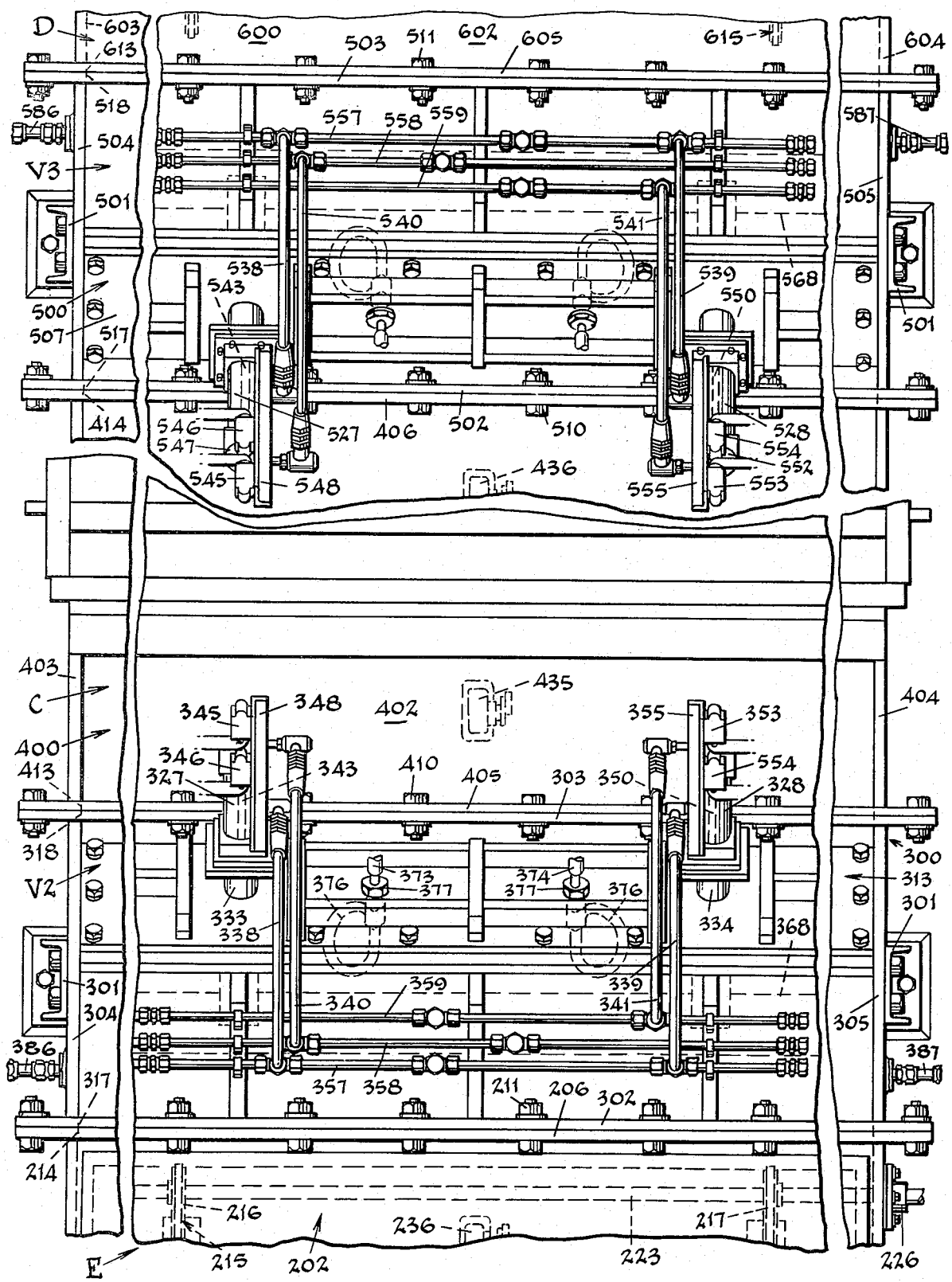
FIG. 17 is a top view of the sealing compartments at the entry and exit ends of the coating chamber.

As shown in FIG. 17, the pipes 338 and 339 to cylinders 355 and 356 are supplied with pressure from a common distributor pipe 357. On the other hand, the pipe 340 to cylinder 327 is supplied from a pipe 358, while the pipe 341 to cylinder 328 is supplied through a pipe 359. The piston rods 343 and 350 enter the sealing compartment V2 through the pedestals 333 and 334 and glands 360; heat dissipating units 361 being provided at the inner ends of said glands. The piston rods 343 and 350 are connected at their inner ends by pins 365 to blocks 366 secured to a plate 367 which forms the top component of a valve member 368 having a chamber 372 therein. This chamber is supplied by pipes 373 and 374 with a cooling fluid to maintain the valve member within an acceptable range of temperature. To enable reciprocal movement of the valve member 368, flexible hoses 376 are connected between fittings 377 in the base plate 330 and the plate 367.

The sealing compartment V2 is closed when the sealing compartment V1 is open to the atmosphere and the sealing compartment V1 then closed during pumping down of the entrance chamber E. The sealing compartment V2 is closed upon application of hydraulic pressure to the upper ends of cylinders 327 and 328 to move the valve member 368 into contact with the fixed panel 379 which is formed in the same manner as the previously described panel 179 in sealing compartment V1. The plate 380 is kept at the desired temperature by means of a U-shaped tubular element 385 fixed to the under surface of said plate and connected to a source of coolant through pipes 386 and 387. A horizontal opening 388 is provided in the panel 379 and is horizontally aligned with the opening 317 in the frontwall 302 of sealing compartment V2 and the opening 318 in the rear wall 303 of the housing 300.

COATING CHAMBER

With particular reference to FIGS. 1, 3, 4, 5, 6, 16, 18, 19 and 20, the coating chamber C embodies an elongated housing 400 which comprises a bottom wall 401, a top wall 402, side walls 403 and 404 and front and rear walls 405 and 406 respectively. The top wall 402 has an inwardly directed flange 407 to provide an open area 408 that is hermetically sealed by a top plate 409, which will be more fully hereinafter described.

The front wall 405 (FIG. 16) of housing 400 is sealingly secured to the rear wall of the sealing compartment V2 by bolts 410, with the seal being effected by an O ring 412. The front wall 405 is provided with an opening 413 which registers with the opening 318 in the rear wall 303 of sealing compartment V2, while the rear wall of the coating chamber C has an opening 414 (FIG. 17) aligned with an opening in the front wall of the sealing compartment V3.

Figure 22:
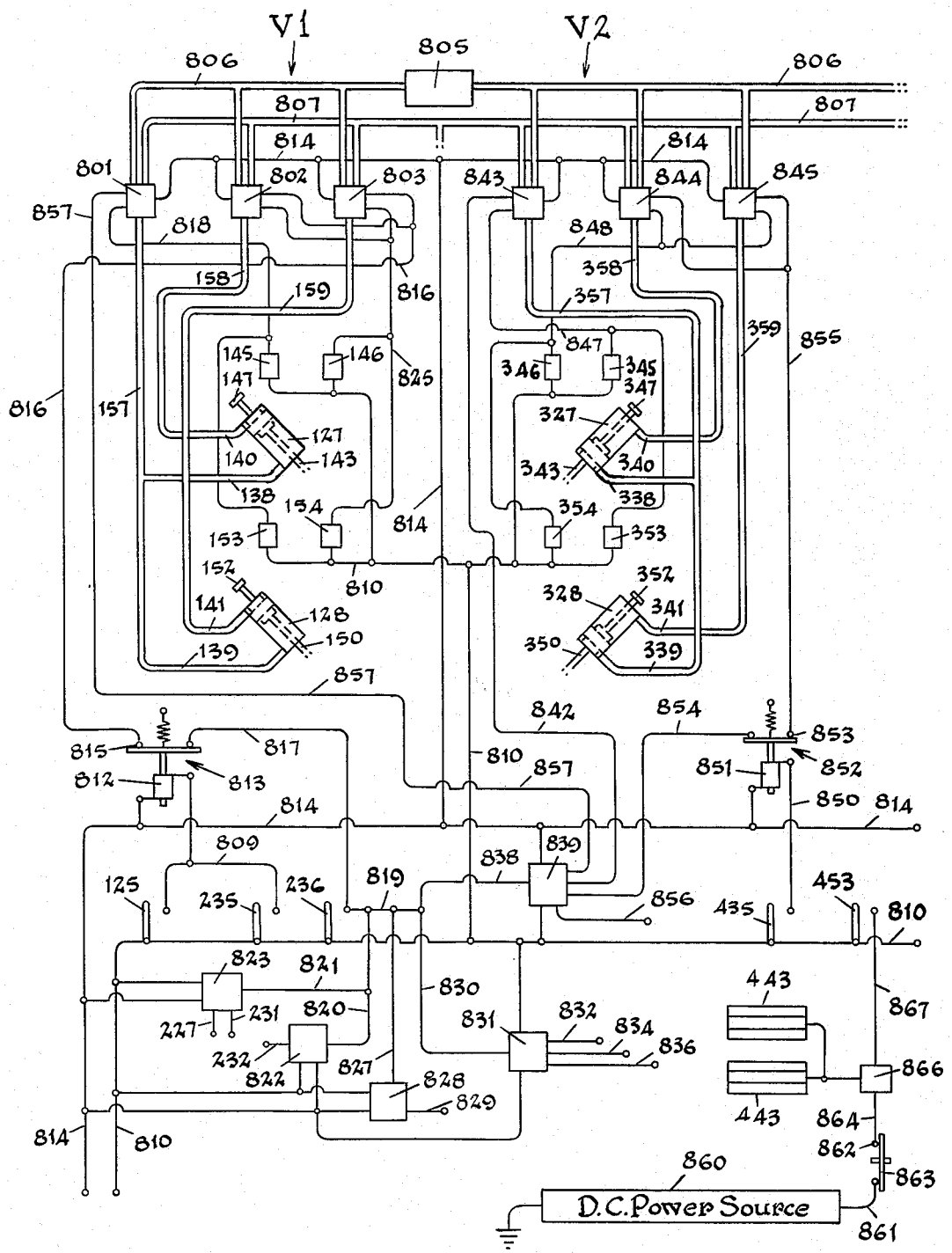
FIG. 22 is a diagrammatic view of the hydraulic and electrical control systems associated with the entrance and coating chambers.

A conveyor 415 is provided within the housing 400 for receiving and carrying the platen P and substrate S as they pass through the openings 318 and 413 from the sealing compartment V2. The conveyor 415 comprises a pair of transversely spaced, horizontal endless roller-type chains 416 and 417 (FIGS. 3, 4 and 18). At the entry end of the coating chamber C, the chains are trained about idler sprockets 418 (FIG. 15) keyed to a shaft 419 journaled in bearings 420, while the opposite looped ends of the chains are trained about sprockets 422 keyed on a driven shaft 423, journaled in gearings 424. Between the sprockets 418 and 422, the upper flights of the chains traverse similar tracks 425 to support the platen. The driven shaft 423 projects outwardly through the side wall 404 of the housing and gland 426 and is joined by an electrically energized clutch 427 to the drive shaft 428 of a motor 430 equipped with a brake 431 (FIGS. 4 and 22). The motor 430 is variably controlled to reduce and/or increase the speed thereof by means of a resistance unit 432. Normally, the conveyor 415 is operated by the motor 430 at a relatively low speed such as, for example, around 8 FPM until the substrate has been completely coated. The resistance unit 432 then increases the speed of the conveyor to, for example, around 60 FPM until the platen P and coated substrate S is received on a conveyor in the exit or discharge chamber D. Thereafter, the resistance unit 432 again reduces the conveyor to its slow speed before "timing out."

The sequence of conveyor operations and the progressively occurring phases of the coating operations are automatically controlled by electrically operated means responsive to movement of the platen P. Thus, the coating chamber C is provided adjacent its entry end with a limit switch 435 that is connected into the circuitry of the switch 236 in the rear end of the entrance chamber E. This ensures against inadvertent closure of the sealing compartment V2 until the trailing end of the platen has cleared the said compartment and been completely received within the chamber C. A limit switch 436, located in the rear end of chamber C, is adapted to coact with a switch in the entry end of the discharge chamber D, for a purpose to be later described.

Referring to FIGS. 6 and 18, the bottom wall 401 of housing 400 is formed in its central area with a plenum chamber 437 having a conduit 438 connected with the diffusion pump of the main vacuum system. Near the entry end of coating chamber C, a conduit 440 (FIG. 3) is attached to the side wall 403 and connects into the general conduit system 262 which provides communication between the coating chamber C and discharge chamber D. To this end, a second conduit 441 (FIG. 4) is provided adjacent the rear end of the chamber C and communication with the discharge chamber D is controlled by a valve 442. When the pressure in the entrance chamber E is to be brought into equilibrium with that in coating chamber C, the equilization valve 442 is closed and by valve 216 communication is established through conduit 440 to conduit 260 and thence to chamber E.

Generally stated, the coating chamber C is equipped with means for preheating and cleaning the glass substrates to properly condition them for receiving the coating material as they pass through said chamber. For this purpose, heating means comprising elongated tubular radiation heaters 443 are mounted in the upper portion of the chamber C adjacent the entry end thereof. The heaters are preferably high-intensity radiation heaters and reflector 444 is mounted over each of the heaters to concentrate the heat on the passing substrates S. The substrates are heated prior to coating to promote outgassing and thereby attain additional surface cleaning and improved adherence of the coating. In the coating of large sheets of glass, thermal stresses which would crack the glass must also be considered.

According to the present invention, the glass substrates will be rapidly transported past a glow-discharge cleaning electrode 447. During coating, the surface of the glass substrate is heated by the electrode and the temperature in the glass drops off through the thickness of the glass. This temperature gradient and the resulting thermal stress can cause breakage of the glass unless the glass is preheated prior to coating. It has been found that preheating the substrates will have no deleterious effect on the quality of the coating produced.

The electrode 447 is a glow-discharge cleaning electrode in the form of a closed loop and is mounted in the top of the coating chamber C adjacent the radiation heaters 443. The purpose of this electrode is to remove any microscopical contaminants from the surface of the substrate to maximize adherence of the coating. Shields 448 are positioned below the electrode 447 and are just large enough to prevent the substrates S from "seeing" the electrode as they pass through the chamber. The electrode 447 is operated as an ordinary sputtering electrode but the shields 448 prevent the electrode material from being deposited on the substrates. The ionized ion of the gas will bombard the surfaces of the substrates to clean them but no coating is deposited.

With reference to FIGS. 3, 4, 6 and 18, the top plate 409 of coating chamber C is provided with four longitudinally spaced rectangular openings 445 in which are mounted panels 446-1, 446-2, 446-3 and 446-4. The panel 446-1 supports the glow-discharge cleaning electrode 447 described above, while the panels 446-2, 446-3 and 446-4 support sputter-coating cathodes 449, 450 and 451 respectively. The three sputter-coating cathodes are in the form of elongated, rectangular plates of the selected coating material. In this embodiment, cathodes 449 and 450 are used to deposit a thin film of a metal, such as nickel or a nickel alloy, while the cathode 451 may be used to deposit a thin protective layer of a siliceous material such as Pyrex glass by radio-frequency sputtering.

In practice, one or more cathodes may be used during the coating operation. Several coatings of different materials may be applied consecutively as, for example, by making cathode 449 of one metal, cathode 450 of a different metal and cathode 451 of a siliceous material. Also, the coating chamber can be increased in length and a greater number of cathodes of the same material used to increase the deposition rate and therefore the production rate.

Figure 23:
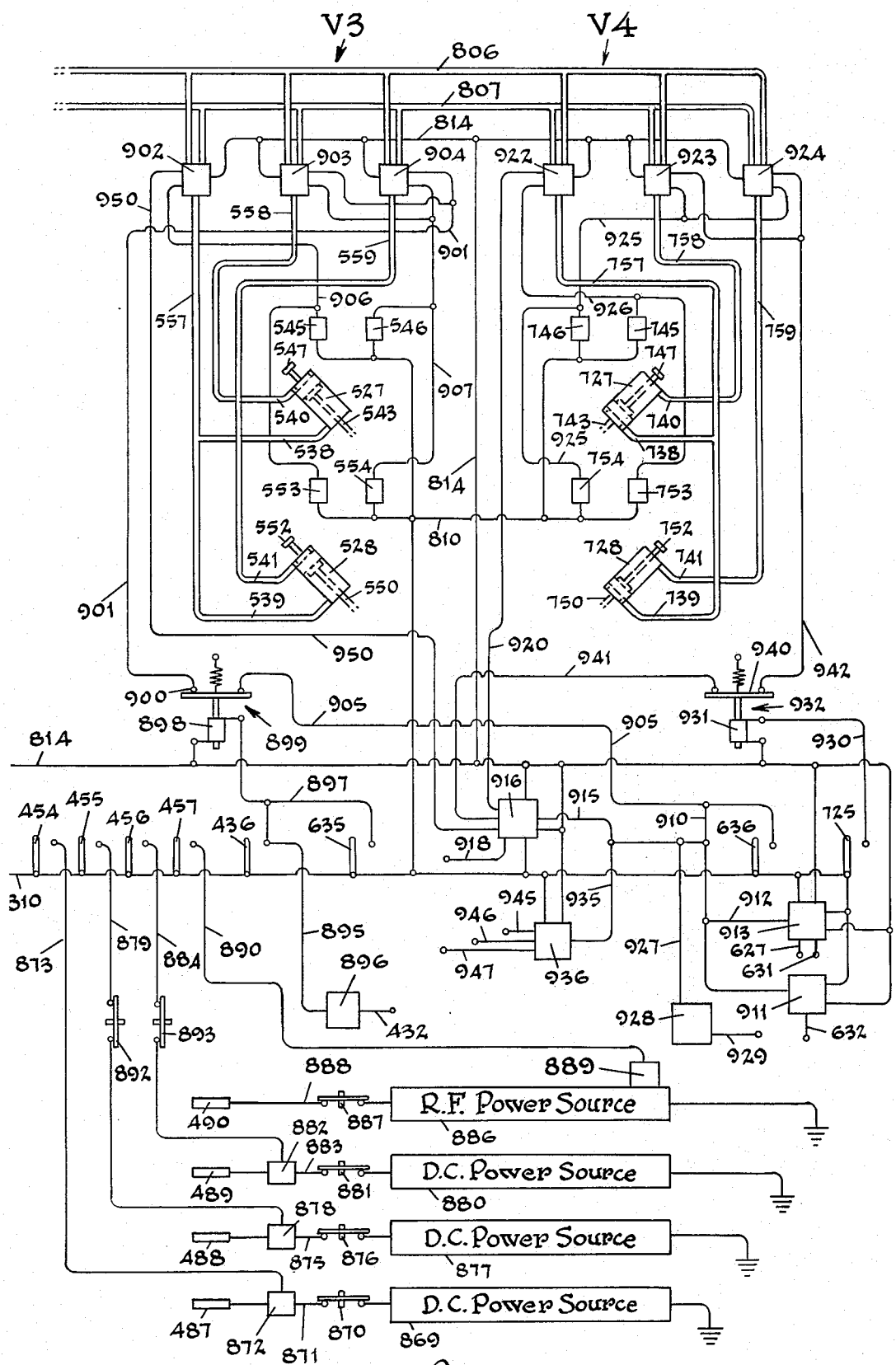
FIG. 23 is a similar diagrammatic view of the systems associated with the coating and discharge chambers.

To guard against over-heating of the electrode 447 and the cathodes 449, 450 and 451, limit switches 454, 455, 456 and 457 are located on the floor 401 of the coating chamber to be actuated by the advancing platen as it approaches the cleaning and coating units. Each of these switches controls a resistance to increase or decrease the potential of the D.C. and radio-frequency power sources (FIG. 23). These switches more particularly serve to conserve the amount of electrical current consumed, to reduce overheating of the coating chamber and to prevent unnecessary loss of the coating materials.

As shown in FIGS. 3 and 4, the coating chamber is connected at its entry and exit ends to suitable purge pumps or units to pump out the argon gas that is leaked into the chamber to maintain a constant pressure therein. The environment inside the chamber is thereby kept clean by supplying new and fresh purified argon gas while, at the same time, withdrawing the contaminated gas. Accordingly, there will be at all times a continuous flow of argon gas into and out of the coating chamber C when the apparatus is in operation. This is without regard to the particular phase or stage in which the apparatus is functioning during the coating operation. For this purpose, as in FIG. 3, a conduit 458 is connected to the chamber C adjacent the entry end thereof and is associated with a first purge pump (not shown), while a conduit 459 (FIG. 4) is connected to said chamber adjacent the exit end thereof and leads to a second purge pump. Thus, there is a continuous circulation of argon gas from the central region of the coating chamber toward the opposite ends thereof.

The electrode 447 and cathodes 449, 450 and 451 (FIG. 6) are mounted on their respective panels 446 by support units generally designated by the numeral 460 (FIGS. 18, 19 and 20). Each of these units includes a stainless steel ring 461 vertically aligned with an opening 462 in the respective panel and sealed thereabout as by welding. As shown in FIGS. 3 and 4, three units are aligned transversely of each panel, with the oppositely disposed outer units being connected to a rectangular, hollow boxlike cathode chamber 463 for coolant purposes, while the center unit carries a conductor rod connected to a power source, as will be later on described. The chambers 463 constitute a component part of the cathodes 449, 450 and 451, as the case may be, and are preferably constructed of a metal having good conductivity, such as aluminum or copper.

As viewed in FIGS. 19 and 20, the support units 460 comprise an annular insulating member 465 having a depending collar 466 disposed above the ring 461, with a cover plate 467, having a central aperature therein, positioned above said insulating member 465. The ring 461 has tapped holes for receiving bolts 468 passing through openings in the insulating member 465 and cover plate 467. An O ring 469 is located between the ring 461 and insulating member 465 to provide a vacuum-tight seal, while an O ring 470 between the insulating member 465 and cover plate 467 serves the same purpose.

The cathode chamber 463 has secured thereto, as by welding, an annular sleeve 472 which is received in concentric relation within the collar 466 depending from insulating member 465. This sleeve is provided at its upper end with a centrally disposed aperature in an inwardly directed rim 473 formed with tapped holes to receive bolts 474 passing through the cover plate 467. An O ring 475 is located around the bolts to afford an additional vacuum-tight seal.

A thin foil sheet 477 of a soft, thermally conductive material, such as aluminum or indium, is positioned between the bottom of the cathode chamber 463 and a support plate 478. The foil sheet 477 serves to increase the area of contact at the interface between the bottom of said chamber and the support plate 478 to improve the thermal conductivity across said interface. The support plate 478 is secured in place by bolts 479. Thus, a plurality of recessed areas 480 are spaced along the sides of the chamber and are provided with holes through which the bolts 479, secured to the support plate, are passed and affixed by nuts 481.

The cathode or source sheet (target) to be sputtered is designated by the numeral 478 and consists of a layer of the selected coating material applied to the support plate 478 by electro-plating, brazing or in some other suitable manner. The coating material may be nickel or a nickel-alloy, although other coating materials may be used, with the thickness of the source sheet being varied as desired. The cathodes are electrically insulated from the supporting panels 446 by the insulating members 465 and depending collars 466, with the cathodes being supported a sufficient distance from the panels 446 to prevent electrical contact or arcing during operation. Grounded shielding plates 483 are welded to the panels 466 at a short distance from the edges of the cathodes to prevent reverse sputtering of the material on the edges of the cathodes.

An electrically conductive rod 484 (FIG. 3) for the glow-discharge cleaning electrode 447 is connected to an individual power source, while the conductor rod 485 for the cathode 449 and the conductor rod 486 for the cathode 450 are connected to separate D.C. power sources. In the case of the cathode 451, the conductor rod 487 thereof is connected to a radio-frequency power source and the associated support plate 488 carries a sheet of siliceous material or the like if it is desired to deposit a thin protective layer over the previously deposited continuous film. With reference to FIG. 19, each of the conductor rods 484, 485, 486 and 487 pass upwardly through a sealed tube 490 in the respective cathode chamber 463 and an opening in the cover plate 467.

As shown in FIGS. 18 and 20, the cathode chamber 463 of the electrode 447 and the chambers of the cathodes 449, 450 and 451 are maintained within a suitable temperature range by the circulation of a coolant therethrough from pipes 492 and 493 respectively (FIG. 3). These pipes are secured as by welding to the upper wall of the chamber and connected to a source of coolant and a sump.

THIRD SEALING COMPARTMENT

As illustrated in FIGS. 1, 4, 7 and 17, the sealing compartment V3 is constructed, as in the case of sealing compartments V1 and V2, of a housing 500 supported on pedestals 501 and having a front wall 502, rear wall 503, side walls 504 and 505, a bottom wall 506 and a top wall 513. The front wall 502 is secured by bolts 510 to the rear wall 406 of the coating chamber C, while the rear wall 503 is secured by bolts 511 to the front wall 602 of the discharge chamber D. The front wall 502 is provided with an opening 517 which registers with the opening 414 in the rear wall 406 of coating chamber C and through which the platens P and substrates S pass into the sealing compartment V4.

As previously described in connection with sealing compartments V1 and V2, the top wall 513 of sealing compartment V3 mounts a pair of cylinders 527 and 528. The lower ends of the cylinders 527 and 528 are connected by pipes 538 and 539 respectively to a common distributor pipe 557 leading to a source of hydraulic pressure, while the upper ends of said cylinders 527 and 528 are connected by pipes 540 and 541 respectively to independent sources of hydraulic pressure through the distributor pipes 558 and 559.

The piston rod 543 having a piston located in cylinder 527 carries a control member 547 to actuate limit switches 545 and 546 mounted by bracket 548 on cylinder 527, at the upper and lower limits of its movement. Similarly, the piston rod 550 of piston 551 contained in cylinder 528 has a control member 552 for actuating the upper and lower limit switches 553 and 554 which are mounted by a bracket 555 on the cylinder 528.

The piston rods 543 and 550 pass through a gland 560 into the housing 500 wherein they are attached to blocks 563 on the valve member 568. Downward movement of the valve member 568 will bring the same into sealing engagement with a fixed panel 579, cooled by circulating fluid through the U-shaped element 585 by pipes 586 and 587. When this surface-to-surface contact of the valve member 568 with the panel 579 is effected, the sealing compartment V3 is closed between the coating chamber C and discharge chamber D. At this time the sealing compartment V4 should be open to permit discharge of a platen P and previously coated substrate S. When the sealing compartment V4 is again closed, the sealing compartment V3 can be opened to enable movement of a following platen and coated substrate into the discharge chamber D, after which the sealing compartment V3 is closed.

DISCHARGE CHAMBER

As illustrated in FIGS. 1, 4, 7 and 21, the discharge chamber D is substantially complementary in construction to that of the entrance chamber E. Thus, this chamber is embodied in a horizontal, elongated housing designated in its entirety by the numeral 600 and comprises a bottom wall 601, top wall 602, side walls 603 and 604 and front and rear walls 605 and 606 respectively. The top wall 602 consists of a horizontal perimeter flange 607 that is hermetically sealed to a top plate 609. The front wall is sealingly secured to the rear wall 503 of the sealing compartment V3 by bolts 610. The rear wall 606 is secured to the front wall 702 of the sealing compartment V4 by bolts 611. The front wall 605 of discharge chamber D is provided with an opening 613 in registry with the opening 518 in the rear wall 503 of the sealing compartment V3, while the rear wall 606 of discharge chamber D has a similar opening 614 aligned with an opening 717 in the front wall 702 of the sealing compartment V4.

Mounted in the housing 600 is a conveyor 615 for receiving the platens P and coated substrates S from the conveyor 415 in the coating chamber C through the sealing compartment V3. The conveyor 615 also includes a pair of transversely spaced, endless roller type chains 616 and 617. At the entry end of the chamber D the chains are trained about idler sprockets 618 fixed on a shaft 619 journaled in bearings 620, while the opposite looped ends of the chains are trained about sprockets 622 fixed to a driven shaft 623 journaled in bearings 624. Between the pairs of sprockets the upper flights of the chains are supported by tracks 625. The shaft 623 projects outwardly of the side wall 604 of discharge chamber D through a gland 626 and is connected to an electrically energized clutch 627 (FIG. 4) to join the shaft 623 to a drive shaft 628 of the motor 630 having a brake 631. The motor 630 is variably controlled by means of a resistance unit 632 to increase and/or reduce the speed of the conveyor 615.

During movement of the platen P from the conveyor 415 in the coating chamber C onto the conveyor 615 in the discharge chamber D, both conveyors operate tandem-wise at the same speed as, for example 8 FPM. When the trailing end of the platen leaves the region of the last cathode, the speed of the conveyors 415 and 615 is increased to about 60 FPM to move the platen and coated sheet out of the coating chamber C. However, when the platen is fully received on the conveyor 615, the speed of the conveyor 415 is substantially reduced to a relatively slow speed as, for example, 8 FPM. The resistance unit 632 is thus adjusted to maintain the speed of the conveyor at 60 FPM until the leading end of the platen approaches the rear end of the discharge chamber D. The resistance unit then functions to stop the conveyor by deenergizing the clutch 627 and energizing the brake 631. After the discharge chamber D has been vacuum broken, the sealing compartment V4 opened and sealing compartment V3 closed, the conveyor 615 resumes operation at a speed of 60 FPM until the platen P and coated substrate S are moved out of the sealing compartment V4. The resistance unit 632 then acts to cause the conveyor 615 to stop as the sealing compartment V4 is again closed. After the platen has been moved from the discharge chamber, the said chamber is dried with warm air until sealing compartment V4 is closed.

A limit switch 635, located near the entry end of the discharge chamber, is connected into the circuit of the switch 436 in the rear end of the coating chamber to prevent inadvertent closing of the sealing compartment V3 until the platen clears switch 635. Located in the rear end of the discharge chamber is a limit switch 636 which cooperates with the switch 725 on the unloading platform 720 to prevent closing of the sealing compartment V4 until the platen has been completely removed therefrom.

The discharge chamber D is connected to the main vacuum system by a conduit 645 through a valve 646 to a backfill unit by conduit 649 via a valve 650 and to a vacuum "break" unit by conduit 653 and valve 654. To enable equalization of the vacuum in coating chamber C and discharge chamber D, a conduit 660 (FIG. 4) enters the side wall 603 of the discharge chamber and, through an equalization valve 442, can be opened to the conduit 262 leading to the coating chamber C.

The discharge chamber D is also adapted to be connected to a warm-air blower system (not shown) to dry the interior of said chamber, as explained above in connection with the entrance chamber E. This system may include a blower unit, a heater and an air-purge unit. Between the heater and the air-purge unit the system is connected to a by-pass valve that is adapted to "shunt" the warm air into the atmosphere while the discharge chamber D is closed and under vacuum.

FOURTH SEALING COMPARTMENT

The sealing compartment V4 (FIGS. 1, 4, 7 and 21) is substantially the same as sealing compartments V1, V2 and V3 and comprises a housing 700 supported by pedestals 701. The housing has a front wall 702 secured to the rear wall 606 of the discharge chamber D by bolts or the like 611 and is provided with an opening 717 which registers with the opening 614 in the wall 606 of the discharge chamber. The rear wall 703 of the housing is provided with an opening 718 aligned with the opening 717 in the front wall. An unloading platform 720 is secured by bolts 723 to said rear wall 703. The platform is provided with roller devices 724 over which the platen and coated substrate are moved as they are advanced from the conveyor 615 in the discharge chamber to a cart or other conveyor apparatus. A limit switch 725 is mounted on the platform to coact with limit switch 636 in the discharge chamber to prevent inadvertent closing of the sealing compartment V4 until the platen has passed beyond said switch 725.

A hood H is mounted on the rear wall 703 of the housing 700 and is connected to an exhaust system to draw off heated air that is introduced into the discharge chamber D for the purpose of warming and drying the interior of said chamber to prevent moisture of ambient air from condensing on the chamber walls.

The top wall 713 of the housing 700 supports a pair of transversely spaced and aligned hydraulically operated cylinders 727 and 728. The lower ends of these cylinders are connected by pipes 738 and 739 to a common distributor pipe 757 leading to a suitable source of pressure, while the upper ends of the cylinders 727 and 728 are connected by pipes 740 and 741 respectively to separate distributor pipes 758 and 759 leading to individual sources of pressure.

The piston rod 743 of piston located in cylinder 727 carries a control member 747 which is adapted to actuate limit switches 745 and 746 at the upper and lower limits of its movements. These switches are mounted by a bracket 748 on the cylinder 727. Likewise, the piston rod 750 of piston contained in cylinder 728 is provided with a control member 752 for actuating the upper and lower limit switches 753 and 754 which are mounted by a bracket 755 on the cylinder 728.

Figure 21:
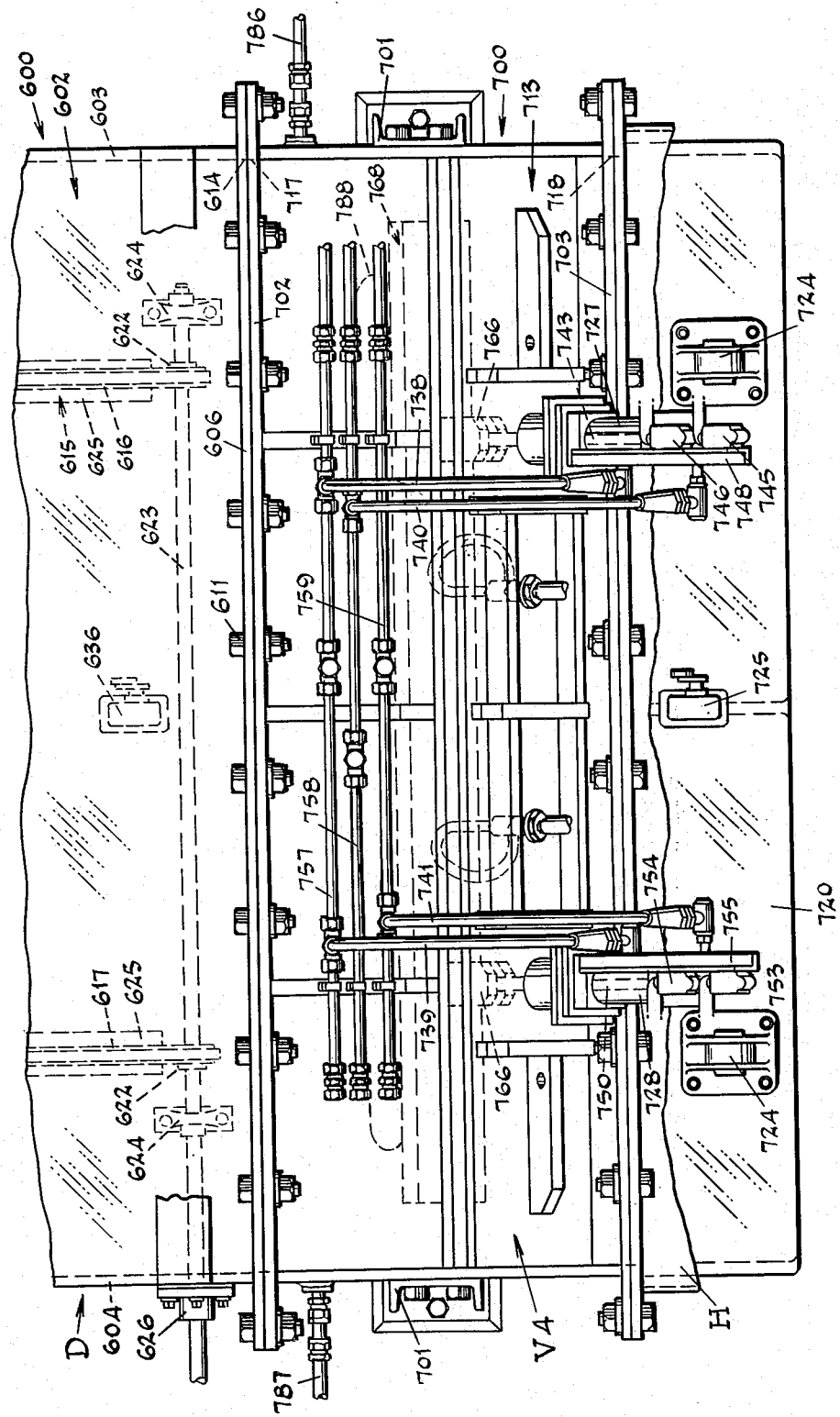
FIG. 21 is a top view of the sealing compartment at the exit end of the discharge chamber and a portion of said chamber.

The piston rods 743 and 750 pass through a gland 760 into the housing 700 wherein they are connected to blocks 766 on the valve member 768. Upon downward movement of the valve member, it will sealingly engage the fixed panel 779 which is cooled by circulating a cooling fluid through a U-shaped element similar to element 385 in FIG. 16, pipes 786 and 787 (FIG. 21). When the valve member is closed, the discharge chamber D is sealed from the ambient atmosphere. When the sealing compartment V4 is subsequently opened after the vacuum has been relieved in the discharge chamber and the sealing compartment is closed, the platen P and coated substrate S can be removed from the apparatus.

SUMMARY OF OPERATION

The following is a summary of the operation of the coating apparatus of this invention in which the sequence of operations is initiated and controlled by movement of the platens, carrying the glass sheets, or other substrates, through the apparatus.

At the beginning of the coating cycle, the sealing compartment V1 is open, sealing compartment V2 closed, sealing compartment V3 open and sealing compartment V4 closed.

The purpose of the diffusion pump referred to above is to pump down the chambers E, C and D initially to a pressure in the neighborhood of about $2 \times 10^{-6}$ torr to clean up any contaminants present in the chambers and to accelerate outgassing from the walls of said chambers which is a source of contamination. This preconditioning of the chambers can usually be done overnight or week ends when the apparatus is not in use.

The platen P, carrying the substrate S to be coated, is removed from the cart T onto the loading platform 120 where the leading end thereof engages and closes a limit switch 125 and, upon continued movement into the entrance chamber E, closes limit switch 235. As long as these switches are closed by the platen, accidental closing of the sealing compartment V1 is prevented.

As the platen moves further into the entrance chamber E, it is received on the conveyor 215 which is being driven to advance the platen at a relatively high speed, for example 60 FPM. The platen continues forwardly at this speed until the leading end thereof closes switch 236 at the exit end of the entrance chamber E which brings the conveyor 215 to a stop. Also, through a timer, the closing of switch 236 causes the closing of sealing compartment V1 and substantially simultaneously, warm air previously introduced into the entrance chamber E is vented to the atmosphere. The entrance chamber is connected with the main vacuum pumping system and after being pumped down to the desired pressure it is backfilled with an inert gas, preferably argon, until the pressure in this chamber is substantially the same as the pressure in the coating chamber C and then is equalized with that in the coating chamber C through the conduit 262; said coating chamber being under continual pressure. When pressure equalization between chambers E and C has been attained, the sealing compartment V2 is opened by a timer to place the coating chamber C in communication with the entrance chamber E. The opening of sealing compartment V2 initiates the operation of the conveyor 215 in entrance chamber E to advance the platen at high speed onto the conveyor 415 in coating chamber C, which is also operating at the same high speed.

When the platen and sheet have been received in the entrance chamber E and sealing compartment V1 closed, the entrance chamber is pumped down from atmosphere to a pressure in the range of 1 to $8 \times 10^{-3}$ torr. It is then backfilled with an inert gas, such as argon, to the pressure which is maintained in the coating chamber C and which is in the range of 2 to $6 \times 10^{-2}$ torr. The equalization valve 261 is then opened to insure that the pressure in entrance chamber E will be the same as the pressure in coating chamber C.

Upon continued forward movement of the platen through the coating chamber C, the leading end of the platen will actuate switch 435 to prevent closing of sealing compartment V2 until the platen is completely within chamber C and to slow down the speed of the conveyors 215 and 415 to around 8 FPM. When the platen is received in chamber C and the trailing end of said platen passes switch 435, the sealing compartment V2 is closed, the entrance chamber E is vacuum broken and the conveyor in said chamber continued at its low speed until the trailing end of the platen passes beyond the switch 436. The sealing compartment V1 is also reopened and the entrance chamber purged with warm air to keep the walls thereof dry until another platen and sheet are introduced.

The coating chamber C is maintained at a constant pressure of about $4 \times 10^{-2}$ torr. On the other hand, the entrance chamber E and discharge chamber D are alternately open to the atmosphere during the time the platens are introduced into the entrance chamber and discharged from the discharge chamber and evacuated to a desired vacuum and backfilled to a pressure equal to that in the coating chamber C when the platen is moved into and out of the coating chamber.

As the platen moves through the coating chamber at low speed, it carries the substrate first beneath the radiation heaters 443 which concentrate heat on the passing substrate to promote outgassing and thereby attain additional surface cleaning and improved adherence of the coating. For example, the substrate can be heated to a temperature within the range of 100° to 250° C.

The substrate then passes beneath the glow-discharge cleaning electrode 447 which is operated as an ordinary sputtering electrode but which is so constructed that the ionized ion of the gas will bombard the surface of the substrate to clean them but no coating will be deposited. Upon continued movement, the substrate is carried successively beneath the sputter-coating electrodes 449, 450 and 451. In this embodiment of the invention, the cathodes 449 and 450 are used to deposit a thin film of a metal, such as nickel or a nickel-alloy, on the substrate, while cathode 451 may be used to deposit a thin protective layer of a siliceous material, such as a Pyrex glass, by radio-frequency sputtering.

In practice, one or more cathodes may be used in the coating chamber. Several coatings of different materials may be applied consecutively as, for example, by making cathode 449 of one metal, cathode 450 of a different metal and cathode 451 of a siliceous material. Or, only one or two of the cathodes may be employed depending upon the type of coating desired. As stated above, the coating chamber C is under controlled pressure at all times, with the entrance chamber E and discharge chamber D being alternately under the same vacuum as the coating chamber and then open to the atmosphere.

When the trailing end of the platen clears the sealing compartment V3, the conveyor 415 in coating chamber C is moving at its low speed and when the platen reaches the exit end of the coating chamber, the leading end thereof closes switch 436 (FIG. 23) to start a timer which, when the trailing end of the platen clears the last cathode 451, acts to increase the speed of the conveyor 415 to quickly move the platen into the discharge chamber D, where it is received on conveyor 615 also traveling at the same speed. When the trailing end of the platen clears the sealing compartment V3, the conveyor 415 in coating chamber C slows down and when the leading end of the platen reaches the discharge end of chamber D, it closes switch 636 (FIG. 4) to close the sealing compartment V3, while the discharge chamber reamins under vacuum. The closing of switch 636 also causes the conveyor 615 to stop. At the same time, closing of the sealing compartment V3 breaks the vacuum in discharge chamber D, opens the sealing compartment V4 and cuases the introduction of warm air into the discharge chamber.

Prior to opening of the sealing compartment V3 to permit passage of the platen into the discharge chamber D, the said discharge chamber has been pumped down to a pressure of about 1 to $8 \times 10^{-3}$ Torr and then backfilled with Argon to the pressure in the coating chamber. To compensate for any slight difference that may exist between the pressure in the discharge chamber and that in the coating chamber, the equalization valve 442 is opened to insure equalization of the pressures in said chambers C and D.

The conveyor 615 then travels at high speed until the platen is removed from the discharge chamber D onto a cart T or suitable conveyor after which the conveyor 615 resumes its slower speed. The sealing compartment V4 is then closed when the trailing end of the platen passes and energizes switch 725, the warm air purge in the discharge chamber vented to the atmosphere and the said chamber again put under vacuum and backfilled to a pressure which is equalized with that in the coating chamber C. The sealing compartment V3 is then opened by a timer actuated by the switch 725 to pump down the discharge chamber D and to equalize the pressure therein with the pressure in coating chamber C. The apparatus is now set-up to receive another platen and substrate to be coated and the above cycle is repeated.

HYDRAULIC PRESSURE SYSTEM AND ELECTRICAL CONTROLS

An exemplary embodiment of a hydraulic pressure system and associated electrical controls for the coating apparatus described above are illustrated in FIGS. 22 and 23. With reference to the first sealing compartment V1, a plurality of electrically controlled valves 801, 802 and 803 are connected to a hydraulic pump 805 through a supply conduit 806, with branches to the said valves. These valves are also connected to a suitable sump through an exhaust conduit 807 and branch conduits. The valve 801 is connected to the lower end of the cylinder 127 by the conduit 138, while the lower end of the cylinder 128 is connected through the conduit 139 to the common distributor pipe 157. The valve 802 is connected to the upper end of cylinder 127 through the conduit 140 and distributor pipe 158, while the upper end of the cylinder 128 is connected to the valve 803 by conduit 141 and distributor pipe 159.

The motors 230, 430 and 630 normally operate continuously to drive the respective conveyors 215, 415 and 615 in tandem (FIG. 1). Operative connections between the motors and conveyors are controlled by the travel of the platens and substrates to be coated through the apparatus, with the speed of the conveyors being automatically varied, halted and then restarted when and as required during performance of the successive operations. Thus, when the platen P and substrate or substrates positioned thereon, are moved over the rollers 124 on the loading platform, the leading end of the platen closes the switch 125 to start the conveyor 215 in the entrance chamber E. Advancing through the compartment V1 and onto the conveyor 215, the platen then closes the switch 235. These switches 125 and 235 are connected to a service line 810 and are joined by a common line 809 to complete a circuit through a solenoid 812 of a spring-biased relay switch 813 to the service line 814.

The disengaged pair of contacts 815 of relay switch 813 thereby open a circuit between lines 816 and 817 to the valves 802 and 803. While contacts 815 are separated, it will be impossible to operate the pistons 144 and 151 in cylinders 127 and 128 to move the valve member 168 downwardly against the valve seat 179 to effect closing of the sealing compartment V1. When the trailing end of the platen has been carried into the entrance chamber E, the switches 125 and 235 drop open to deenergize the solenoid 812. A circuit by lines 816 and 817 is then completed through the reenergized contacts 815. As the leading end of the platen approaches the rear end of the entrance chamber, it closes the switch 236.

Initially, the switch 236 completes a circuit from service line 810 through lines 816 and 817 to the valves 802 and 803 to service line 814. At this time, upper limit switches 145 and 153 are already closed by control members 147 and 152 to complete line 818 to the exhaust side of valve 801 to open the same to the sump through conduit 807. Substantially simultaneously, the switch 236 completes circuits by lines 819, 820 and 821 to a pair of timing relays 822 and 823. The line 821 activates the timing relay 823 which monitors a short interval of time and then deenergizes the clutch 227 and energizes the brake 231 to bring the conveyor to a stop. The relay 822 is adjusted to monitor several phases of activity of the resistance unit 232 which initially reduces the speed of the conveyor 215 from a relatively high speed to a relatively low speed (as described above) and then, after a predetermined interval of time, returns the conveyor to its high speed.

When hydraulic pressure is introduced from the supply conduit 806 through valves 802 and 803 and distributor pipes 158 and 159 to conduits 140 and 141, pressure is applied to the upper ends of cylinders 127 and 128 to move the pistons 144 and 151 downwardly to bring the valve member 168 into engagement with the valve seat 179 and thereby close the passageway 188 therein. As the pistons 144 and 151 move downwardly, fluid in the lower ends of cylinders 127 and 128 will be exhausted through conduits 138 and 139 and distributor pipe 157 to the sump conduit 807 via the valve 801. When contact of the valve member 168 with the valve seat 179 has been made, the control members 147 and 152 close the lower limit switches 146 and 154 which completes a common line 825 from service line 810 to open the exhaust sides of valves 802 and 803.

By branch line 827 from line 819, a circuit is completed from line 810 to a timing relay 828 which is connected by line 829 to the valve 266 in the conduit 265 and close communication of the warm-air purge system to the interior of the entrance chamber E. The timing relay 828 is preferably adjusted to monitor an interval of time during which the valve 266 is closed. When the sealing compartment V2 is closed, said relay 828 "times" out after the sealing compartment V1 has been reopened to the atmosphere.

Substantially simultaneously, line 830 energizes a timing relay 831 to initially create a circuit by line 832 to open the valve 246 in the conduit 245 which connects the entrance chamber E to the main vacuum system until the desired pressure therein has been attained. The vacuous condition in the entrance chamber increases the effectiveness of the seal between the valve members 168 and 368 and the valve seats 179 and 379.

When the required pressure has been reached in entrance chamber E, the relay 831 completes a line 834 and opens line 832 closing valve 246 to stop the pump down. This relay also opens the valve 250 in the conduit 249 of a backfill unit to discharge a small quantity of an inert gas into said entrance chamber. Raising of the pressure to around 10 microns is followed by the creation of a line 836 from the relay 831 to open the valve 261 in the conduit 260 to put the entrance chamber in communication with the coating chamber C by way of conduits 262, 440 and 441, the oppositely disposed valve 442 then being closed. This places the chambers E and C in an equalized vacuous condition preparatory to opening of the sealing compartment V2.

Then, from line 819, branch line 838 energizes a timing relay 839 to, in a first phase, complete the circuit of line 842 through the valve 843 to connect the supply conduit 806 to the distributor pipe 357 and conduits 338 and 339 to the lower ends of cylinders 327 and 328. When hydraulic pressure is applied to the lower ends of the cylinders 327 and 328, the pistons 344 and 351 will effect separation of the valve member 368 from the valve seat 379 in the sealing compartment V1 to open the passageway 388. When the piston rods 343 and 350 of pistons 344 and 351 respectively reach the upper limit of their movement the control members 347 and 352 carried thereby close the switches 345 and 353 so that the circuit of line 847 will be completed to open the exhaust side of valve 843 to the sump pipe 807.

When the sealing compartment V2 is fully open, the relay 823 times out to deenergize the brake 231 and permit the clutch 227 to restart the conveyor 215 to advance the platen through the sealing compartment V2 onto the conveyor 415 in the coating chamber C and release switch 236. During transfer of the platen from the conveyor 215 onto the conveyor 415, the resistance 232 maintains the conveyor 215 at its high speed, at which speed the conveyor 415 is also moving. When the platen is partially within the coating chamber, the resistance 232 times out to resume movement of the conveyor 215 at its low speed.

The platen then closes switch 435 (FIGS. 5 and 15) which is connected to service line 810 to complete a circuit by line 850 through the solenoid 851 of a spring-biased relay switch 852 to service line 814. The disengaged pair of contacts 853 of said relay switch open a circuit between lines 854 and 855 to the valves 844 and 845. While the contacts 853 are separated, inadvertent downward movement of the pistons in cylinders 327 and 328 to close the valve member 368 of sealing compartment V2 will be prevented.

After the trailing end of the platen has passed completely through the sealing compartment V2, releasing switch 435, the timing relay 839 opens line 842 and completes the circuit of lines 854 and 855 through the valves 844 and 845 to service line 814. Pressure is thus applied from supply conduit 806 to distributor pipes 358 and 359 to the upper ends of cylinders 327 and 328. As the pistons are moved downwardly in cylinders 327 and 328, hydraulic pressure in the lower ends of said cylinders is exhausted via conduits 338, 339 and 357 and the valve 843 to the sump through discharge conduit 807. The control members 347 and 352 carried by the piston rods 343 and 350 of pistons 344 and 351 close switches 346 and 354 when the piston rods reach the lower end of their stroke, the valve member 368 is in contact with the valve seat 379. Switches 346 and 354 are then closed to establish the circuit of line 848 to the exhaust sides of valves 844 and 845.

When the sealing compartment V2 is closed, the relay 839 activates a line 856 to the valve 254 which opens the conduit 253 to relieve the vacuum in the entrance chamber E through the baffling unit 255. Line 857 then completes a circuit through the valve 801 to service line 814. This will connect supply conduit 806 to the distributor pipe 157 and conduits 138 and 139 to the lower ends of cylinders 127 and 128. As the piston rods 143 and 150 move upwardly, the upper ends of these cylinders are connected through conduits 140 and 141 and 158 and 159 and valves 802 and 803 to the sump pipe 807. When the piston rods reach the upper limit of their movement and the sealing compartment V1 fully open, the control members 147 and 152 again close switches 145 and 153 to complete line 818 to the exhaust side of valve 801. The relay 828 then times out so that the valve 266 reopens conduit 265 to connect the warm-air purge unit to the entrance chamber E.

As heretofore described, radiation heaters 443 are located in the entry end of the coating chamber C to heat the glass substrate to the desired temperature. In FIG. 22, a circuit is illustrated between a D.C. power source 860 and the heaters which is completed by line 861 through the contacts 862 of a switch 863 and line 864. If desired, a rheostat 865 can be interposed in line 864 and reulated by closing of switch 453 and line 867 to adjust the temperature of the heaters.

To conserve the current output from the D.C. and R.F. power sources, to also reduce over-heating of the coating chamber C and to conserve the coating materials on the source sheets of the cathodes 449, 450 and 451, means is provided to reduce the power output to said cathodes. Thus, as shown in FIG. 23, the D.C. power source 869 is connected by a manual switch 870 and line 871 to the rod 487 of the glow-discharge unit 447 through a rheostat 872. Said rheostat is controlled by switch 454 through line 873 from line 810. Similarly, the rod 488 of the cathode 449 is connected by line 875 via a switch 876 to the D.C. power source 877 through a rheostat 878 which is controlled by the switch 455 by line 879. The rod 489 of the cathode 450 is connected to the D.C. power source 880 through a manual switch 881 and rheostat 882 by line 883. The amount of current output through the rheostat 882 is controlled by the switch 456 via line 884. The rod 490 of the cathode 451, which may be employed to apply a thin protective coating PL on the base coating L on the substrate S, is connected to the radio-frequency power source 886 through a manual switch 887 and line 888. A rheostat 889 is interposed in the lower source and controlled by the switch 457 by way of line 890.

At this point in the continuing operation of the coating apparatus, the sealing compartment V4 at the exit end of the discharge chamber D has reclosed and said chamber put under vacuum which is equalized with the vacuum in the coating chamber C. In consequence, the sealing compartment V3 is open and the platen is moved continuously into the discharge chamber. As the platen enters the coating chamber, it initially closes switch 454 to release the rheostat 872 and increase the power output by line 871 to the rod 487 and the glow-discharge electrode 447. The platen in sequence then closes switch 455 and switch 456 to release rheostats 878 and 882 thereby increasing the output of power from D.C. sources 877 and 880. The rods 488 and 489 of cathodes 449 and 450 thus conduct sufficient current to effect the sputtering of thin films of the selected metal or metals on the upper surface of the glass substrate. In the event it is desired not to use both cathodes 449 and 450 in the same operation, switches 892 and 893 can be interposed in the lines 879 and 884 to render one or the other of the cathodes inoperable. A thin protective film of a siliceous material may be sputtered upon the base coating on the substrate by cathode 451 as the platen closes switch 457 to release the rheostat 889 and allow current from the radio-frequency power source 886 to flow by line 888 to the rod 490 of the cathode 451.

As the trailing end of the platen passes through and beyond the areas of the radiant heaters 443, glow-discharge electrode 447 and sputtering cathodes 449, 450 and 451, it successively releases switches 453, 454, 455, 456 and 457 to reduce the output of power to the said heaters, electrode and cathodes by the respective rheostats 866, 872, 878, 882 and 888. When the coating operation has been completed and the trailing end of the platen approaches the rear area of the coating chamber C, the switch 436 is closed. This switch is connected by line 895 to a timing relay 896 which monitors and controls the resistance 432 and activates the same to increase the speed of the conveyor 415. This more rapid speed is commensurate with the speed at which the conveyor 615 is operating so that the platen is quickly removed from the coating chamber C into the discharge chamber D. The relay 896 before "timing" out causes the conveyor 415 to revert to its high speed after sealing compartment V3 closes.

As the platen is carried through the open sealing compartment V3 and while switch 436 is closed, switch 635 is also closed. These switches are interlocked by line 897 to complete a circuit from service line 810 through the solenoid 898 of a spring-biased relay switch 899 to service line 814. This disengages the contacts 900 and breaks the continuity of line 901 to the valves 903 and 904 with line 905. Inadvertent closing of the sealing compartment V3 is thereby prevented. As the platen approaches the rear area of the discharge chamber, it releases switches 436 and 635 to enable reengagement of the contacts 900 of the relay switch 899.

The platen then closes switch 636 to complete the circuit of line 905 from service line 810 and line 901 to the valves 903 and 904 and stops conveyor 615. These valves connect supply conduit 806 to distributor pipes 558 and 559 and conduits 540 and 541 to apply hydraulic pressure to the upper ends of the cylinders 527 and 528. This moves the pistons 544 and 551 to project the piston rods 543 and 550 downwardly to bring the valve member 568 into sealing engagement with the valve seat 579 to close the passageway therein. As the pistons move downwardly, fluid in the lower ends of the cylinders 527 and 528 is exhausted through conduits 538 and 539 and distributor pipe 557 to the sump pipe 557 via valve 902. When contact of the valve member 568 with the valve seat 579 has been made and the piston rods have reached the lower limit of their stroke, control members 547 and 552 carried by said piston rods act to close switches 546 and 554 carried by cylinders 527 and 528, which complete a common line 907 from service line 810 to open the exhaust sides of the valves 903 and 904.

The switch 636 also completes a circuit by line 910 to the timing relay 911 which controls the resistance unit 632 to change conveyor 615 to its high speed. The relay 911 monitors an interval of time during which the platen is carried outwardly through the sealing compartment V4 at high speed and removed from the apparatus. Branch line 912 activates a timing relay 913 to monitor a short interval of time after which it deenergizes the clutch 627 and energizes the brake 631 to halt operation of the conveyor 615.

With the sealing compartment V3 being closed, a circuit by line 915 energizes a timing relay 916 to create a line 918 to the valve 654 in the conduit 653 to the baffling chamber 655 that acts to relieve the vacuum in the discharge chamber D preparatory to opening of the sealing compartment V4. The relay 916 then completes the circuit of line 920 to a valve 922 for operation of the cylinders 727 and 728, valves 923 and 924 also cooperating to produce operation of said cylinders. Presently closed switches 746 and 754 have made the circuit of line 925 to the exhaust sides of valves 923 and 924 for exhaust of hydraulic fluid from the upper ends of the cylinders 727 and 728.

When hydraulic pressure from supply conduit 806 is connected through the valve 922 to the distributor pipe 757 and conduits 738 and 739, pressure will be introduced into the lower ends of the cylinders 727 and 728. The pistons 744 and 751 are forced upwardly by said pressure to open the valve 768 in the sealing compartment V4. Hydraulic fluid is released from the upper ends of the cylinders through conduits 740 and 741 and the exhaust sides of valves 923 and 924 to the sump pipe 807. Also, when the sealing compartment V4 is fully open and the piston rods 743 and 750 reach the upper limit of their stroke, switches 745 and 753 are closed to complete line 926 to the exhaust side of the valve 922.

By lines 915 and 927 from switch 636, a circuit is completed to a timing relay 928 which is connected by line 929 to the valve 666 in the conduit 665 of the warm-air purge system. The relay acts to open the valve 666, while the sealing compartment V4 is open for removal of the platen. When the relay times out after subsequent closing of the sealing compartment, the valve 666 is again closed.

When the platen and coated substrate are to be removed from the discharge chamber D, the relay 912 times out to deenergize the resistance unit 632 and brake 631 while reenergizing the clutch 627. The conveyor 615 is thus restarted to move the platen onto and over the unloading platform 720 on the roller devices to a suitable receiving apparatus or conveyor. The switch 725 is then closed to complete a circuit by line 930 through the solenoid 931 of a spring-biased relay switch 932 to service line 814. Before the switch 636 is released by the platen, a branch line 935 from line 915 energizes a timing relay 936. While the solenoid 931 is energized, the pair of contacts 940 are disengaged to break the circuit of lines 941 and 942 to the valves 923 and 924. The relay 936 monitors a period of time for the platen to clear the platform and then activates line 941. At this time, the switch 725 has dropped open and the circuit of line 930 is broken. The contacts 940 again engage to connect line 941 to lines 942 and 943. Valves 923 and 924 transmit hydraulic fluid from supply conduit 806 to distributor pipes 758 and 759 and conduits 740 and 741 to the upper ends of the cylinders 727 and 728. The piston rods 743 and 750 now move downwardly to bring the valve member 768 into sealing engagement with the valve seat 779 of the sealing compartment V4. When the valve has been closed and the piston rods reach the lower limit of their movement, the control members 747 and 752 carried thereby close switches 746 and 754 on cylinders 727 and 728 which completes the common line 925 to the exhaust sides of the valves 923 and 924.

When the sealing compartment V4 is closed, the timing relay 936 initially creates a circuit by line 945 to open the valve 646 in the conduit 645 and connect the discharge chamber D to the main vacuum system until the desired pressure has been attained in said chamber. The vacuous condition in the discharge chamber increases the effectiveness of the sealing engagement between the valve members 568 and 768 and valve seats 579 and 779. When the required pressure in the discharge chamber is reached, the relay 936 completes line 946 to open valve 650 in the conduit 649 of the backfill unit 648 to discharge a relatively small quantity of an inert gas into the said chamber. Raising of the pressure in the discharge chamber is followed by creation of a line 947 to open the valve 442 to place the discharge chamber in communication with the coating chamber by way of conduits 660, 262, 440 and 441, the oppositely disposed valve 261 being closed. This places chambers C and D in an equalized vacuous condition preparatory to reopening of the sealing compartment V3.

The timing relay 916 then completes the circuit of line 950 through valve 902 to connect the supply conduit 806 to the distributor pipe 557 and conduits 538 and 539 to the lower ends of the cylinders 527 and 528. At this time, switches 546 and 554 are closed to complete the line 907 to open the exhaust sides of the valves 903 and 904. Hydraulic pressure in the upper ends of the cylinders is relieved through conduits 558 and 559, conduits 540 and 541 and the exhaust sides of the valves 903 and 904 to the sump pipe 807. When the sealing compartment V3 is fully open and the piston rods 543 and 550 of the pistons in said cylinders reach the upper limit of their stroke, the switches 545 and 553 are closed to complete the circuit of line 906 to the exhaust side of the valve 902.

The above detailed description covers one complete cycle of operations of the apparatus beginning with the introduction of the platen P and substrate S to be coated into the first sealing compartment V1 and discharge of the platen and coated substrate from the fourth sealing compartment V4. When the cycle of operations has been completed the sealing compartments are in the same relative positions as they were at the beginning of the cycle. Thus, the sealing compartment V1 is open, sealing compartment V2 closed, sealing compartment V3 open and sealing compartment V4 closed.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

We claim:
1. Apparatus for continuous production of sputter-coated glass sheets and the like, which comprises:
   a. a plurality of aligned independently controlled chambers having communication with one another and including an entrance chamber, a coating chamber and a discharge chamber,
   b. means for sealing the coating chamber from the entrance and discharge chambers and for sealing the entry end of the entrance chamber and exit end of the discharge chamber from the atmosphere,
   c. a support-platen having a horizontal upper surface for supporting a sheet to be coated in a horizontal position,
   d. conveyor means for supporting the platen and sheet in a horizontally disposed position and for conveying them successively through the entrance, coating and discharge chambers,
   e. means connected to the entrance chamber, the coating chamber and the discharge chamber for controlling the pressures therein,
   f. means for admitting an inert gas into the coating chamber to maintain an inert gas atmosphere therein,
   g. sputter-coating means mounted in the upper portion of the coating chamber for depositing a continuous film of a selected coating material on the upper surface of the sheet as it moves through the coating chamber, and
   h. means actuated in response to movement of the platen for selectively opening and then closing in timed relation the means for sealing the coating chamber from the entrance and discharge chambers and the means for sealing the entry end of the entrance chamber and the exit end of the discharge chamber.

2. The apparatus of claim 1 in which said sealing means at the opposite ends of the coating chamber and at the entry end of the entrance chamber and exit end of the discharge chamber comprise sealing compartments, and valve means located in each of said sealing compartments and operable in response to movement of the platen.

3. The apparatus of claim 2 including means responsive to movement of the platen for sequentially closing the valve means in the sealing compartment at the entry end of the entrance chamber; for establishing a desired pressure in the entrance chamber; for opening the valve means in the sealing compartment at the entry end of the coating chamber; for transferring the platen from the entrance chamber into the coating chamber; for closing the valve means in the sealing compartment at the entry end of the coating chamber and for opening the valve means in the sealing compartment at the entry end of the entrance chamber.

4. The apparatus of claim 3 including means responsive to movement of the platen for sequentially closing the valve means in the sealing compartment at the exit end of the discharge chamber; for establishing a desired pressure in the discharge chamber; for opening the valve means in the sealing compartment at the exit end of the discharge chamber; for discharging the platen and coated sheet from the coating chamber into the discharge chamber; for closing the valve means in the sealing compartment at the exit end of the coating chamber and for opening the valve means in the sealing compartment at the exit end of the discharge chamber.

5. The apparatus of claim 2 including hydraulically operated means for selectively opening and closing said valve means during movement of the platen and sheet through successive chambers, and means responsive to movement of the platen for controlling the operation of said hydraulic means.

6. The apparatus of claim 1 including variable speed conveying means for receiving and conveying the platen and sheet through successive chambers, and means responsive to movement of the platen for varying the speed of said conveyor means to move the platen from the entrance chamber into the coating chamber at a relatively high speed, to reduce the speed of travel of the platen through the coating chamber and to discharge the platen from the coating chamber into the discharge chamber at a relatively high speed.

7. The apparatus of claim 6 in which the conveyor means includes aligned conveyors mounted in the entrance chamber, coating chamber and discharge chamber, and means operable by movement of the platen for driving the conveyors in the entrance and coating chambers at a relatively high speed to transfer the platen from said entrance chamber into said coating chamber; for reducing the speed of the conveyor in the coating chamber during coating of the sheet; and for driving the conveyors in the coating chamber and discharge chamber at a relatively high speed to transfer the platen and coated sheet from the coating chamber into the discharge chamber.

8. The apparatus of claim 1 including electric heating means mounted in the coating chamber to promote outgassing at the sheet surface and minimize thermal stresses in the sheet, glow-discharge means also mounted in said chamber prior to said sputter-coating means for bombarding the surface of the sheet with ions to clean the surface prior to coating, and control means responsive to movement of the platen through the coating chamber for regulating the operation of the electric heating means, the glow-discharge means and the sputter-coating means.

9. The apparatus of claim 1 including means for establishing an initial pressure in the entrance and discharge chambers, and means connecting the entrance and discharge chambers with the coating chamber for then backfilling said entrance and discharge chambers with an inert gas to equalize the pressure therein with the pressure in the coating chamber.

10. The apparatus of claim 1 in which the sputter-coating means comprises a substantially rectangular cathode disposed horizontally above the path of travel of the platen, means for securing a sheet of a selected coating material to the bottom of the cathode, means for mounting the cathode, means connecting the cathode to a power source, said cathode being provided with a chamber, and means for circulating a coolant through said chamber.

11. Apparatus for continuous production of sputter-coated glass sheets and the like, which comprises:
a. a coating chamber having entry and exit openings,
b. a platen having a horizontal upper surface for supporting a sheet to be coated in a horizontal position,
c. conveyor means for supporting the platen and sheet in a horizontally disposed position and for passing them into the coating chamber through the entry opening and discharging them through the exit opening,
d. means for sealing the entry and exit openings of the coating chamber when the platen and sheet are supported therein,
e. means connected to the coating chamber for controlling the pressure therein,
f. sputter-coating means mounted in the upper portion of said chamber for depositing a continuous film of a selected coating material on the upper surface of the sheet as it moves through said chamber, and
g. means actuated in response to movement of the platen for selectively opening and then closing the means for sealing the entry and exit openings of the coating chamber.

12. The apparatus of claim 11 in which said sealing means includes closure means located at the opposite ends of the coating chamber for placing said chamber in vacuum-tight relation to the entrance chamber and discharge chamber, said closure means comprising sealing compartments, and valve means located in each compartment and operable in response to movement of the platen.

13. Apparatus for continuous production of sputter-coated glass sheets and the like, which comprises:
a. a plurality of aligned, independently controlled chambers having communication with one another and including an entrance chamber, a coating chamber and a discharge chamber,
b. conveying means for supporting the sheet in a horizontally disposed position and for conveying the same successively through the entrance, coating and discharge chambers,
c. means connected to the entrance, coating and discharge chambers for controlling the pressure therein,
d. sputter-coating means mounted in the upper portion of the coating chamber for depositing a continuous film of a selected coating material on the upper surface of the sheet as it moves through the coating chamber,
e. sealing compartments located between the opposite ends of the coating chamber and the adjacent ends of the entrance and discharge chambers and at the entry end of the entrance chamber and exit end of the discharge chamber, each of said compartments comprising side, front and rear, and top and bottom walls, said front and rear walls having horizontal elongated, aligned openings therein, and
f. valve means in each sealing compartment comprising an angularly disposed valve seat having a horizontal elongated opening aligned with the openings in the front and rear walls of said compartment, a hydraulic cylinder carried by the top wall of the compartment and inclined to the vertical, a piston having a piston rod mounted in said cylinder, an angularly disposed valve member carried at the inner end of the piston rod adapted to engage the valve seat to seal the opening therein, and means connected to said cylinder adjacent the opposite ends thereof for selectively supplying hydraulic pressure to and withdrawing it from said cylinder to effect the opening and closing of said valve.

14. The apparatus of claim 13 which includes limit switches carried by said cylinder, and control members carried by said piston rod for activating said switches when the piston rod reaches the upper and lower limits of its movement to control the supply of hydraulic pressure to and its withdrawal from said cylinder.

* * * * *